US012176651B2

(12) United States Patent
Zantout et al.

(10) Patent No.: US 12,176,651 B2
(45) Date of Patent: Dec. 24, 2024

(54) CONDUCTOR TERMINAL

(71) Applicant: IDEAL Industries, Inc., Sycamore, IL (US)

(72) Inventors: Alan E. Zantout, Sycamore, IL (US); Sushil N. Keswani, Sycamore, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 129 days.

(21) Appl. No.: 17/905,401

(22) PCT Filed: Jun. 21, 2021

(86) PCT No.: PCT/US2021/038221
§ 371 (c)(1),
(2) Date: Aug. 31, 2022

(87) PCT Pub. No.: WO2021/258043
PCT Pub. Date: Dec. 23, 2021

(65) Prior Publication Data

US 2023/0123609 A1 Apr. 20, 2023

Related U.S. Application Data

(60) Provisional application No. 63/040,815, filed on Jun. 18, 2020.

(51) Int. Cl.
*H01R 13/629* (2006.01)
*H01R 4/48* (2006.01)

(52) U.S. Cl.
CPC ........... *H01R 13/629* (2013.01); *H01R 4/483* (2023.08); *H01R 4/485* (2023.08); *H01R 4/4821* (2023.08)

(58) Field of Classification Search
CPC ............ H01R 4/48365; H01R 4/48455; H01R 13/629; H01R 12/515; H01R 4/4816; H01R 4/483
See application file for complete search history.

(56) References Cited

U.S. PATENT DOCUMENTS 4,171,861 A 10/1979 Hohorst
4,940,431 A 7/1990 Hennemann
(Continued)

FOREIGN PATENT DOCUMENTS

DE 202005018168 U1 1/2006
DE 202006020822 U1 8/2010
(Continued)

OTHER PUBLICATIONS

ISA/US, Int. Search Report and Written Opinion issued on PCT application No. PCT/US21/38221, dated Sep. 28, 2021, 18 pages.
(Continued)

*Primary Examiner* — Travis S Chambers
(74) *Attorney, Agent, or Firm* — Greenberg Traurig, LLP

(57) ABSTRACT

Disclosed herein is a conductor connection clamp that includes a bus bar and a clamping spring, the clamping spring including a main portion for clamping an electrical conductor to the bus bar, the main portion and bus bar defining a clamping spring connection, and a spring member adjacent to the main portion and rigidly coupled to the main portion. The clamp further includes a housing defining a conductor insertion opening that leads to the clamping spring connection, and an operating lever configured to apply force to the spring member in order to deflect the main portion to open the clamping spring connection.

27 Claims, 15 Drawing Sheets

(56) References Cited

U.S. PATENT DOCUMENTS

| | | | |
|---|---|---|---|
| 5,022,873 | A | 6/1991 | Kollmann |
| 5,062,024 | A | 10/1991 | Hennemann |
| 5,772,464 | A | 6/1998 | Hohorst |
| 6,010,376 | A | 1/2000 | Kollmann |
| 6,074,241 | A | 6/2000 | Patel et al. |
| 7,182,631 | B2 | 2/2007 | Kollmann |
| 7,384,319 | B2 | 6/2008 | Kirstein |
| 7,651,363 | B2 | 1/2010 | Koellmann |
| 7,988,504 | B2 | 8/2011 | Stromiedel |
| 8,075,336 | B2 | 12/2011 | Koellman |
| 8,142,204 | B2 | 3/2012 | Giesbrecht |
| 8,444,443 | B2 | 5/2013 | Schafmeister |
| RE44,490 | E | 9/2013 | Kirstein |
| 8,529,291 | B2 | 9/2013 | Kuhlmann |
| 8,714,992 | B2 | 5/2014 | Truemper |
| 9,300,060 | B2 | 3/2016 | Niemann |
| 9,373,904 | B2 | 6/2016 | Binner |
| 9,437,940 | B1 | 9/2016 | Rao et al. |
| 9,474,178 | B2 | 10/2016 | Binner |
| 9,478,874 | B2 | 10/2016 | Stolze |
| 9,500,793 | B2 | 11/2016 | Mickmann |
| 9,502,790 | B2 | 11/2016 | Kollmann |
| 9,543,700 | B2 | 1/2017 | Köllmann |
| 9,614,301 | B2 | 4/2017 | Ludewig |
| 9,819,106 | B2 | 11/2017 | Froebing |
| 9,825,402 | B2 | 11/2017 | Köllmann |
| 9,847,587 | B2 | 12/2017 | Ludewig |
| 10,014,596 | B2 | 3/2018 | Hartmann |
| 10,193,245 | B2 * | 1/2019 | Lorenschat ........ H01R 4/48365 |
| 10,236,597 | B2 | 3/2019 | Meyer |
| 10,418,727 | B1 | 9/2019 | Wu |
| 10,608,377 | B2 | 3/2020 | Koellmann |
| 10,892,578 | B2 | 1/2021 | Witte |
| 11,005,207 | B2 | 5/2021 | Mastel |
| 11,024,987 | B2 | 6/2021 | Koellmann |
| 11,146,018 | B2 * | 10/2021 | Koellmann ........ H01R 4/48365 |
| 11,228,139 | B2 | 1/2022 | Mastel |
| 11,387,582 | B2 | 7/2022 | Stolze |
| 11,539,147 | B2 * | 12/2022 | Tseng ..................... H01R 11/09 |
| 11,777,233 | B2 * | 10/2023 | Koellmann .......... H01R 13/508 439/441 |
| 2013/0157520 | A1 | 6/2013 | Koellmann |
| 2015/0372401 | A1 | 12/2015 | Stolze |
| 2016/0049737 | A1 | 2/2016 | Aporius et al. |
| 2018/0254568 | A1 | 9/2018 | Koellmann |
| 2019/0131724 | A1 | 5/2019 | Koellmann |
| 2021/0218161 | A1 | 7/2021 | Froebing |
| 2022/0109271 | A1 | 4/2022 | Moser |

FOREIGN PATENT DOCUMENTS

| | | | |
|---|---|---|---|
| DE | 202018004944 | U1 | 1/2020 |
| DE | 202018106899 | U1 | 3/2020 |
| DE | 102018124623 | A1 | 4/2020 |
| EP | 347774 | A | 12/1989 |
| EP | 1391965 | B1 | 1/2009 |
| EP | 1624528 | B1 | 5/2010 |
| EP | 1850418 | B1 | 8/2011 |
| EP | 2246938 | B1 | 11/2011 |
| EP | 2395605 | B1 | 7/2013 |
| EP | 2056403 | B1 | 10/2013 |
| EP | 2280453 | B1 | 8/2014 |
| EP | 2865252 | B1 | 4/2015 |
| EP | 2865252 | B2 | 4/2015 |
| EP | 2375503 | B1 | 7/2015 |
| EP | 2790271 | B1 | 8/2015 |
| EP | 2947718 | A1 | 11/2015 |
| EP | 2509171 | B1 | 9/2016 |
| EP | 2608323 | B1 | 9/2016 |
| EP | 2953213 | B1 | 9/2016 |
| EP | 2917971 | B1 | 12/2016 |
| EP | 2306594 | B1 | 5/2017 |
| EP | 2953208 | B1 | 10/2017 |
| EP | 3238306 | A | 11/2017 |
| EP | 2916390 | B1 | 5/2018 |
| EP | 3038212 | B1 | 5/2018 |
| EP | 2837064 | B1 | 8/2018 |
| EP | 3196981 | B1 | 8/2018 |
| EP | 3118938 | B1 | 9/2018 |
| EP | 2263289 | B1 | 12/2018 |
| EP | 3292591 | B1 | 1/2019 |
| EP | 3061154 | B1 | 4/2019 |
| EP | 2956992 | B1 | 7/2019 |
| EP | 3200288 | B1 | 8/2019 |
| EP | 3460919 | B1 | 11/2019 |
| EP | 3595090 | A | 1/2020 |
| EP | 3384561 | B1 | 2/2020 |
| EP | 3391470 | B1 | 3/2020 |
| EP | 3324490 | B1 | 4/2020 |
| EP | 3111513 | B1 | 5/2020 |
| EP | 3518350 | B1 | 6/2020 |
| EP | 3667825 | A | 6/2020 |
| EP | 2956993 | B1 | 4/2021 |
| EP | 2956994 | B1 | 4/2021 |
| EP | 3477793 | B1 | 4/2021 |
| EP | 3435488 | B1 | 9/2021 |
| EP | 3687002 | B1 | 9/2021 |
| EP | 3734768 | B1 | 9/2021 |
| EP | 3767758 | B1 | 9/2021 |
| EP | 2846408 | B2 | 4/2022 |
| EP | 2605335 | B2 | 10/2022 |
| ES | 2523244 | T3 | 11/2014 |
| ES | 2601197 | T3 | 2/2017 |
| ES | 2601197 | T5 | 2/2017 |
| ES | 2745459 | T3 | 3/2020 |
| ES | 2871850 | T3 | 11/2021 |

OTHER PUBLICATIONS

U.S. Appl. No. 63/040,815, filed Jun. 18, 2020.

Examination Report from Australian patent application No. 2021292753, dated Jul. 28, 2023, 3 pp.

Extended European Search Report from application No. 21825501.6, dated Jun. 5, 2024, 12 pp.

* cited by examiner

SECTION A–A

SECTION B–B

FIG. 4B
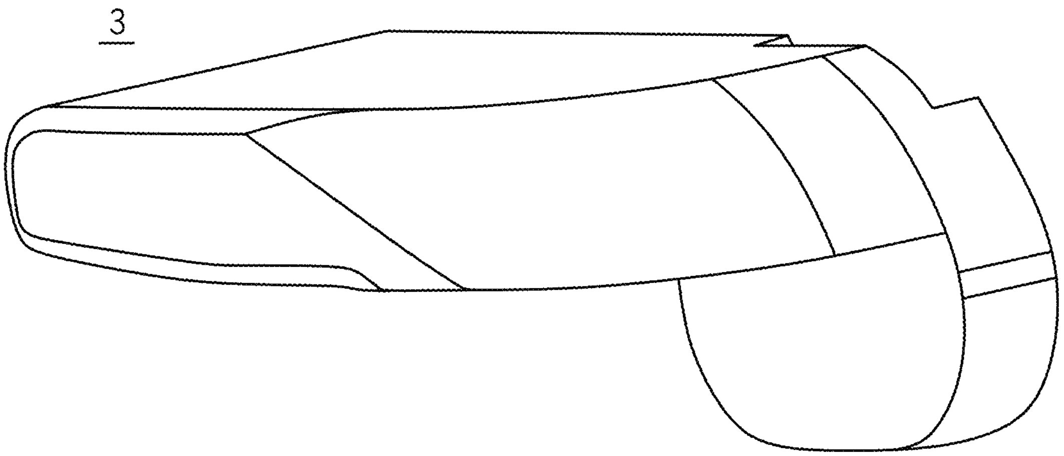
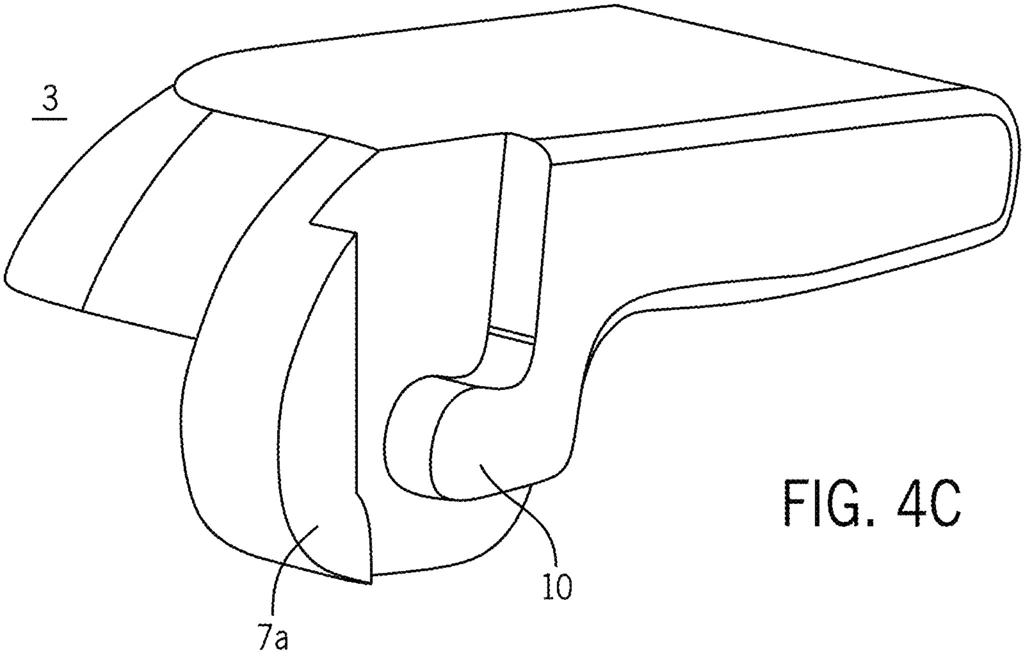
FIG. 4C

CONDUCTOR TERMINAL

CROSS-REFERENCE TO RELATED APPLICATION

This application claims priority to U.S. provisional application No. 63/040,815, filed May 19, 2020, which application is hereby incorporated by reference in its entirety.

BACKGROUND

Conductor terminals are described in U.S. Pat. Nos. 9,466,895 and 8,794,994, each of which is incorporated herein by reference in its entirety.

U.S. Pat. No. 9,466,895 describes a conductor terminal that comprises a housing, that is embodied from an insulating material, at least one resilient force clamping connector, and at least one actuating element that is received in a pivotable manner in the housing, the actuating element being designed so as to open in each case at least one allocated resilient force clamping connector. The actuating element comprises two lever arm sections that are spaced apart from one another, that protrude at least in part with a pivot bearing region into the housing, that are connected one to the other, and that are spaced apart with respect to the pivot bearing region by a transverse connecting piece to a lever arm. The at least one resilient force clamping connector is covered on the side of the housing on which the at least one actuating element is arranged by an outer boundary wall of the housing and extends from the outer boundary wall on both sides of lateral wall sections that are adjacent to a respective allocation resilient force clamping connector into the inner space of the housing.

U.S. Pat. No. 8,794,994 describes a connection terminal having at least one busbar piece and at least one clamping spring. The connection terminal has at least one spring-force clamping connection formed from a clamping spring and a portion of a busbar piece, an insulating-material housing including at least one conductor insertion opening which leads to a spring-force clamping connection and extends in a conductor insertion direction, and at least one pivotably mounted operating lever designed to interact with at least one clamping spring in order to open at least one spring-force clamping connection. The operating lever can be arranged with its rotation axis in the conductor insertion opening or in the path of the conductor insertion opening in the direction of the clamping point. The connection terminal provides a space-saving and compact construction, which is also improved in respect of the force effect of the operating lever.

SUMMARY

In a first aspect of the present disclosure, a conductor connection clamp is disclosed. The clamp includes a bus bar and a clamping spring, the clamping spring including a main portion for clamping an electrical conductor to the bus bar, the main portion and bus bar defining a clamping spring connection, and a spring member adjacent to the main portion and rigidly coupled to the main portion. The clamp further includes a housing defining a conductor insertion opening that leads to the clamping spring connection, and an operating lever configured to apply force to the spring member in order to deflect the main portion to open the clamping spring connection.

In an embodiment of the first aspect, the conductor connection clamp includes a bearing arm configured to support the operating lever, the operating lever comprises a lever arm and a wedge portion, and actuation of the lever arm causes the wedge portion to wedge between the bearing arm and the spring member so as to apply force to the spring member.

In an embodiment of the first aspect, the operating lever is rotatably mounted and includes a pivot portion, the pivot portion adjacent to the wedge portion, wherein the bearing arm supports the pivot element.

In an embodiment of the first aspect, the main portion and spring member are formed from a monolithic body of material.

In an embodiment of the first aspect, the spring member is a first spring member, and the clamping spring further includes a second spring member that is rigidly coupled to the main portion.

In an embodiment of the first aspect, the first and second spring members are disposed on opposed sides of the main portion.

In an embodiment of the first aspect, the clamping spring further includes a base portion, wherein the spring member and main portion both extend along a conductor insertion direction from the base portion.

In an embodiment of the first aspect, the main portion extends further in the conductor insertion direction than does the spring member.

In an embodiment of the first aspect, a center axis of the conductor insertion opening is offset from a location of the clamping spring connection.

In an embodiment of the first aspect, the operating lever comprises an insulative wall configured to guide a conductor from the conductor insertion opening to the clamping spring connection.

In an embodiment of the first aspect, the operating lever is configured to interact with the clamping spring in order to apply force to the spring member at a force application point to actuate the clamping spring connection between an open state and a closed state, wherein the operating lever is rotatably coupled to the housing and is configured to rotate about a rotation axis, the conductor insertion opening leads to the clamping spring connection along a conductor insertion direction, and the force application point is, in the open state, on a first side of a plane that is parallel to the insertion direction and that includes the rotation axis, wherein the force application point is on a second side of the plane in the closed state.

In an embodiment of the first aspect, the operating lever is rotatably coupled to the housing and is configured to rotate about a rotation axis, wherein the operating lever is asymmetric across a midpoint of the rotation axis.

In a second aspect of the present disclosure, a conductor connection clamp is disclosed. The clamp includes a bus bar, a clamping spring, the clamping spring and bus bar defining a clamping spring connection, the clamping spring connection having a closed state and an open state, the clamping spring connection configured to retain a conductor at a clamping location in the closed state, and a housing defining a conductor insertion opening that leads to the clamping spring connection, the insertion opening defining a center axis extending along a conductor insertion direction. The center axis of the insertion opening is offset from the clamping spring location.

In an embodiment of the second aspect, the conductor insertion opening includes an asymmetric lead-in portion.

In an embodiment of the second aspect, the clamp further includes a rotatably-mounted operating lever configured to apply force to the clamping spring to actuate the clamping spring connection between the closed state and the open state, wherein the operating lever rotates about a rotation axis, wherein the lead-in portion includes at least one surface that is parallel to the rotation axis and an opposed surface that is asymmetric to the at least one parallel surface.

In an embodiment of the second aspect, the housing includes a front face plane, wherein the lead-in portion is at a non-perpendicular angle to the front face plane.

In an embodiment of the second aspect, an entry portion of the conductor insertion opening is at a non-perpendicular angle to the front face plane, wherein the entry portion and lead-in portion are at the same angle with respect to the front face plane.

In a third aspect of the present disclosure, a conductor connection clamp is provided. The clamp includes a bus bar, a clamping spring for clamping an electrical conductor to the bus bar, the clamping spring and bus bar defining a clamping spring connection having an open state and a closed state, a housing defining a conductor insertion opening that leads to the clamping spring connection, and an operating lever configured to interact with the clamping spring in order to actuate the clamping spring connection between the open state and the closed state, the operating lever including an insulative wall configured to guide a conductor from the conductor insertion opening to the clamping spring connection.

In an embodiment of the third aspect, the clamp further includes a bearing arm configured to support the operating lever, wherein the insulative wall is disposed between the bearing arm and a conductor clamping location where the clamping spring connection is configured to retain a conductor in the closed state.

In an embodiment of the third aspect, the insulative wall projects perpendicular to a conductor insertion direction in the closed state and parallel to the conductor insertion direction in the open state.

In an embodiment of the third aspect, the insulative wall rotates about a rotation axis that is perpendicular to the conductor insertion direction between the open state and the closed state.

In an embodiment of the third aspect, the operating lever comprises a pivot supported by the housing and configured to rotate about a rotation axis, wherein the insulative wall is disposed between the pivot and a conductor clamping location where the clamping spring connection is configured to retain a conductor in the closed state.

In an embodiment of the third aspect, the operating lever includes two insulative walls disposed on opposed sides of a conductor clamping location where the clamping spring connection is configured to retain a conductor in the closed state.

In a fourth aspect of the present disclosure, a conductor connection clamp is provided. The clamp includes a bus bar, a clamping spring for clamping an electrical conductor to the bus bar, the clamping spring and bus bar defining a clamping spring connection having an open state and a closed state, a housing defining a conductor insertion opening that leads to the clamping spring connection along a conductor insertion direction, and an operating lever configured to interact with the clamping spring in order to apply force to the clamping spring at a force application point to actuate the clamping spring connection between the open state and the closed state, wherein the operating lever is rotatably coupled to the housing and is configured to rotate about a rotation axis. The force application point is, in the open state, on a first side of a plane that is parallel to the insertion direction and that includes the rotation axis, wherein the force application point is on a second side of the plane in the closed state.

In an embodiment of the fourth aspect, the operating lever comprises a user-manipulable lever arm, the lever arm disposed on the first side of the plane.

In a fifth aspect of the present disclosure, a conductor connection clamp is provided. The clamp includes a bus bar, a clamping spring for clamping an electrical conductor to the bus bar, the clamping spring and bus bar defining a clamping spring connection having an open state and a closed state, a housing defining a conductor insertion opening that leads to the clamping spring connection along a conductor insertion direction, and an operating lever rotatably coupled to the housing and configured to rotate about a rotation axis, the lever configured to interact with the clamping spring in order to apply force to the clamping spring at a force application point to actuate the clamping spring connection between the open state and the closed state. The operating lever is asymmetric across a midpoint of the rotation axis.

In an embodiment of the fifth aspect, the conductor connection clamp includes a bearing arm configured to support the operating lever, the operating lever comprises a lever arm and a wedge portion, and actuation of the lever arm causes the wedge portion to wedge between the bearing arm and the clamping spring so as to apply force to the spring member.

In an embodiment of the fifth aspect, the operating lever is rotatably coupled to the housing and is configured to rotate about a rotation axis, wherein rotation of the operating lever causes the wedge portion to wedge between the bearing arm and the spring member so as to apply force to the spring member.

In an embodiment of the fifth aspect, the operating lever is rotatably coupled to the housing and is configured to rotate about a rotation axis, wherein the operating lever includes only one pivot by which the operating lever is coupled to housing, the pivot supported by the bearing arm.

BRIEF DESCRIPTION OF THE DRAWINGS

For a better understanding of the subject conductor terminals, reference may be had to the following drawings.

FIGS. 4A-4E illustrate a construction of an example conductor terminal.

DETAILED DESCRIPTION

Figure 1A:
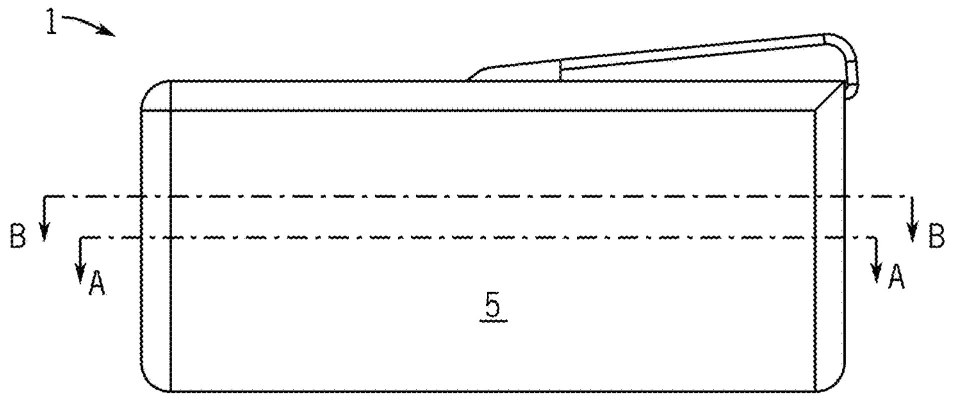
FIGS. 1A-1E illustrate a construction of an example conductor terminal.
Figure 1B:
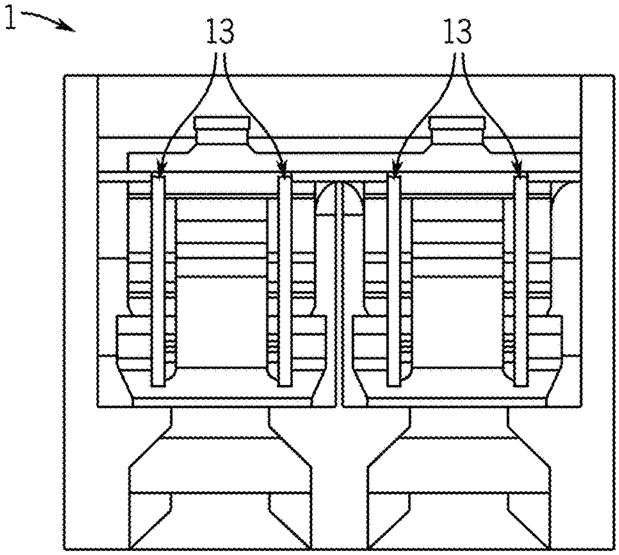
Figure 1C:
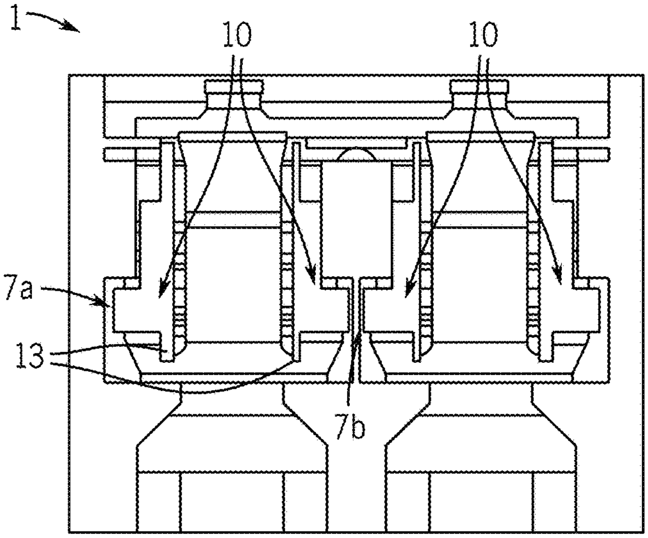
Figure 1D:
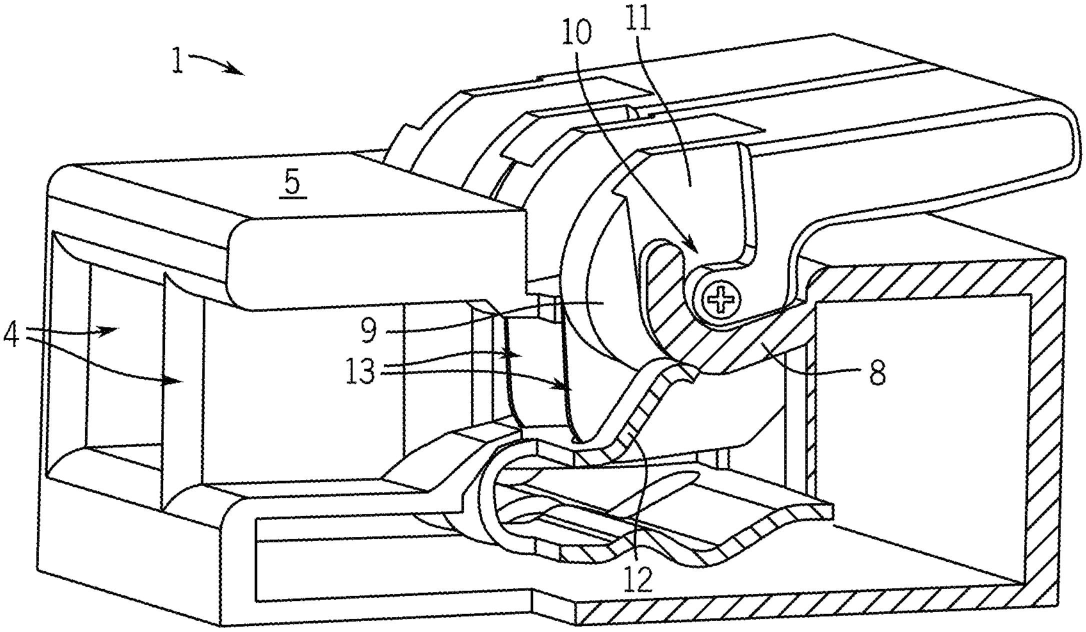
Figure 1E:
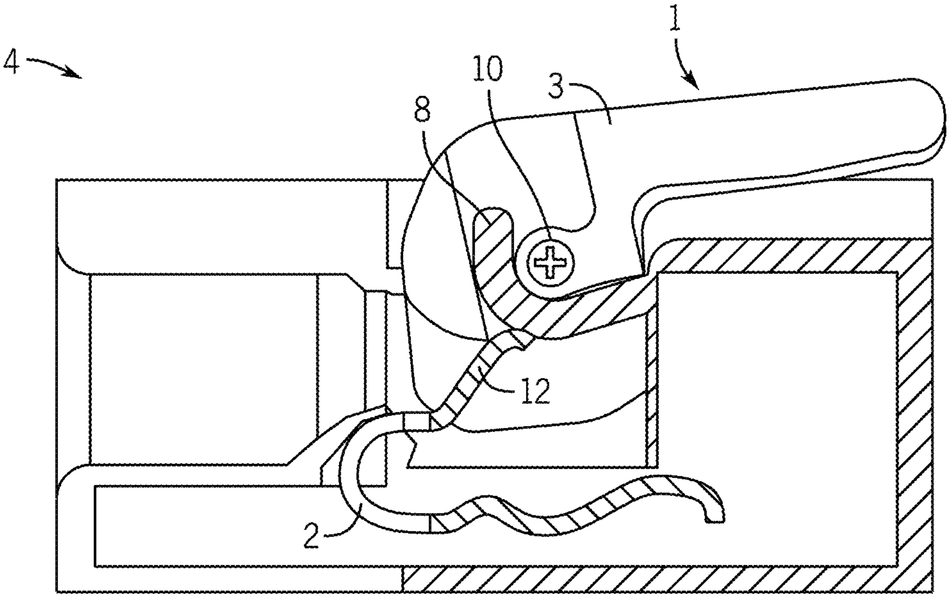

Described herein are examples of improved conductor terminals.

In one described example, the conductor terminal comprises one or more asymmetric actuating elements that are designed to open individual spring clamps related to conductor ports. The actuating elements have one lever arm section and an "L" shaped cross-section along the length of the element. The portion of the actuating element opposite of the bearing surface has a surface which covers the entire width of the wire port. By this construction, the conductor terminal has the benefit of providing a narrower device as compared to a conductor terminal having an actuating element that uses two lever arm sections, the benefit of being simpler to assemble, the benefit of providing a relatively wider lever section allowing for an improved user experience owing to the need for the application of less pressure from a user's hand/fingers, etc.

In one described example, the conductor terminal comprises one or more actuating elements designed to open individual spring clamps related to conductor ports. The actuating elements have two lever arm sections designed to provide side walls for conductor wire entry. These sidewalls help to guide the electrical conductor into their fully seated position within the spring clamps. By this construction, the conductor terminal has the benefit of providing a conductor terminal that is relatively easier to use and manufacture, the benefit of reducing the amount of material required to construct the conductor terminal thereby further reducing manufacturing costs, etc.

In one described example, the conductor terminal comprises one or more actuating elements designed to open individual spring clamps related to conductor ports. The center axis of the spring clamp entry/opening is not shared with the center axis of the conductor entry port and these ports are planarly misaligned. By this construction, the conductor terminal has the benefit of creating a tortuous path which, in turn, improves the wire retention capabilities of the conductor terminal, etc.

In one described example, the conductor terminal comprises one or more actuating elements designed to open individual spring clamps related to conductor ports. The center axis of the spring clamp entry/opening is not shared with the center axis of the conductor entry port and these ports are angularly misaligned. By this construction, the conductor terminal has the benefit of creating a tortuous path which, in turn, improves the wire retention capabilities of the conductor terminal, etc.

In one described example, the conductor terminal comprises one or more actuating elements designed to open individual spring clamps related to conductor ports. The position of the bearing surface moves relative to the lever arm and the pivot point as the actuating element rotates to open or close the spring clamp. By this construction, the conductor terminal has the benefit of providing a conductor terminal that is relatively easier to use and manufacture.

In one described example, the conductor terminal comprises one or more actuating elements designed to open individual spring clamps related to conductor ports. The rotation axis of the actuating elements is positioned within the body of the electrical connector but outside of the region created by a transverse extension of the conductor insertion opening. By this construction, the conductor terminal has the benefit of providing a conductor terminal that is relatively easier to use and manufacture.

A better understanding of these and other benefits as well as the overall features, properties and relationships of the subject conductor terminals will be obtained from the following description and accompanying drawings which set forth illustrative examples which are indicative of the various ways in which the principles hereinafter described may be employed.

Figure 3A:
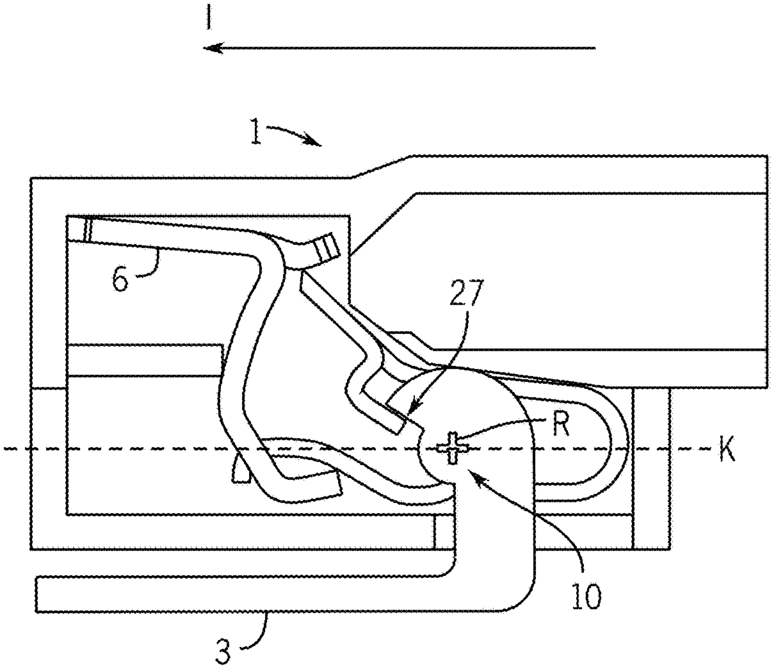
FIGS. 3A-3B illustrate a construction of an example conductor terminal.
Figure 3B:
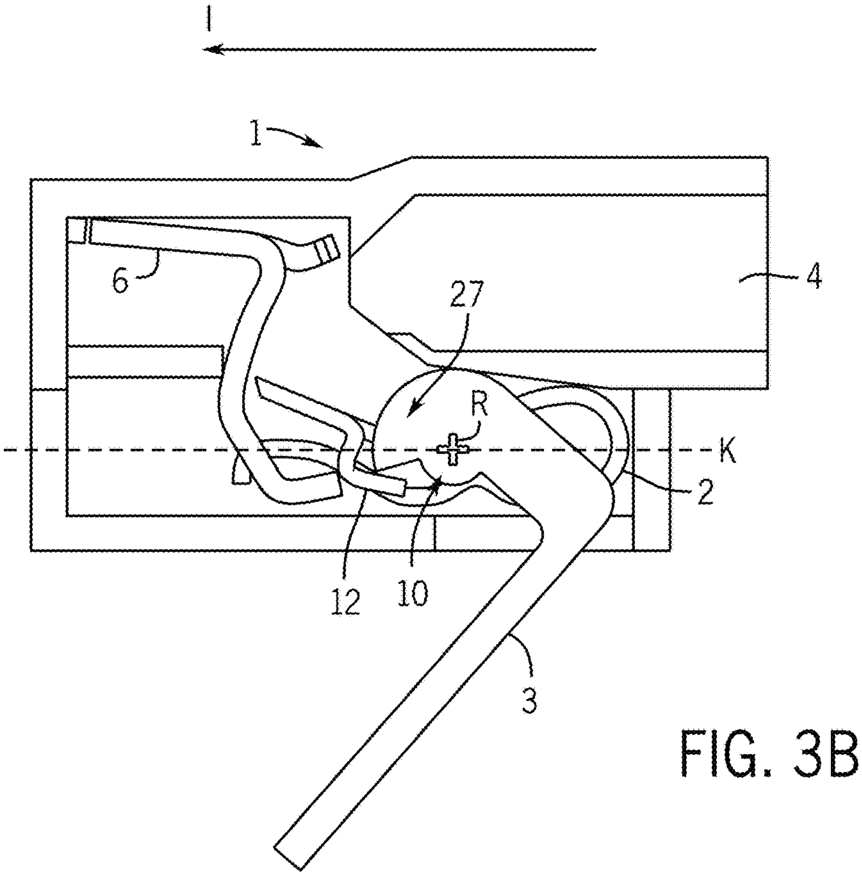

Referring to the figures, wherein like numerals refer to the same or similar features in the various views, the following describes various conductor terminals 1 each in the form of a lever-actuated socket clamp having a housing 5 that is embodied from an insulating material and one or more actuating elements 3 also embodied from an insulating material. When plural actuating elements 3 are provided, the actuating elements may be arranged adjacent one to the other as illustrated in the figures. One or more conductor insertion openings 4 are arranged at the front end of the housing, also adjacent one to the other as appropriate, for receiving an electrical conductor. Each conductor insertion opening 4 provides a passage to a resilient force clamping spring 2. The one or more actuating elements 3 cooperate with the one or more clamping springs 2 to provide a means for a user to manipulate to clamp an electrical conductor, which has been inserted into the conductor terminal 1 via the insertion opening 4, within the conductor terminal 1, between a clamping spring 2 and a bus bar 6. More particularly, by virtue of pivoting the actuating element 3 from a closed state into an open state (for example as illustrated in FIGS. 3A and 3B, respectively), a resilient clamping element, such as a spring member 12, of the clamping spring 2 is influenced by means of the actuating element 3 and a clamping spring connection or clamping site is formed by means of the resilient clamping element being moved relative to a current rail or bus bar 6. Upon returning the actuating element 3 to the closed state, the clamping spring 2 will tend back towards its original, uninfluenced position and thereby function to clamp the electrical conductor within the conductor terminal, i.e., between the resilient clamping element 12 and the current rail 6. It will be appreciated that pivoting the actuating element 3 from the closed state to the open state can likewise be used to remove a previously clamped, electrical conductor from the conductor terminal 1.

In the examples illustrated in FIGS. 1A-3B, each actuating element 3 comprises two operating portions 7*a*, 7*b* (each of which may be referred to individually as an operating portion 7) that are spaced apart from one another. This produces a pivot lever whose operating portions 7*a*, 7*b* protrude in part into the housing 5. Each operating portion 7 may include a wedge portion 9, a pivot portion 10, and a recess 11 between the wedge portion 9 and the pivot portion 10. The pivot portion 10, and the rotation axis R defined by the pivot portion 10, point or rotation axis R of the actuating elements 3 is positioned within the body of the conductor terminal 1 but outside of the region created by a transverse extension of the conductor insertion opening 4.

Figure 4A:
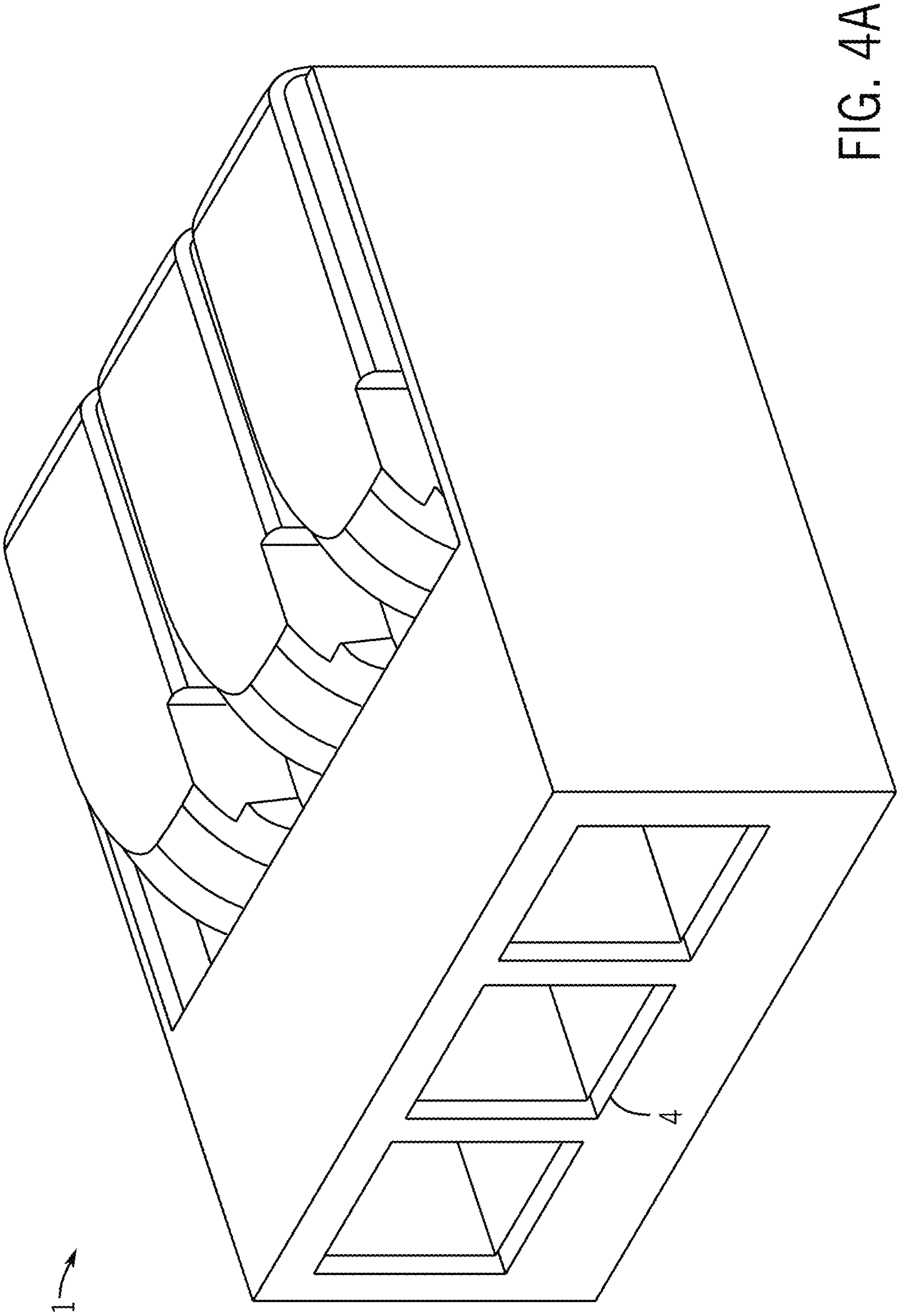
Figure 4D:
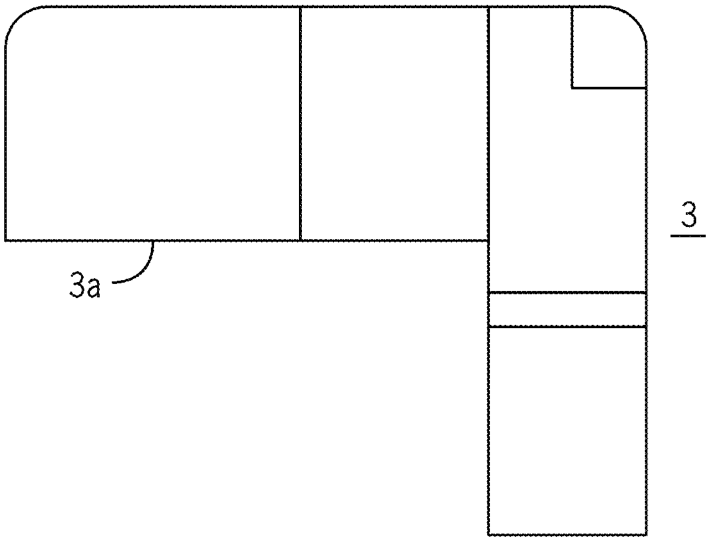
Figure 4E:
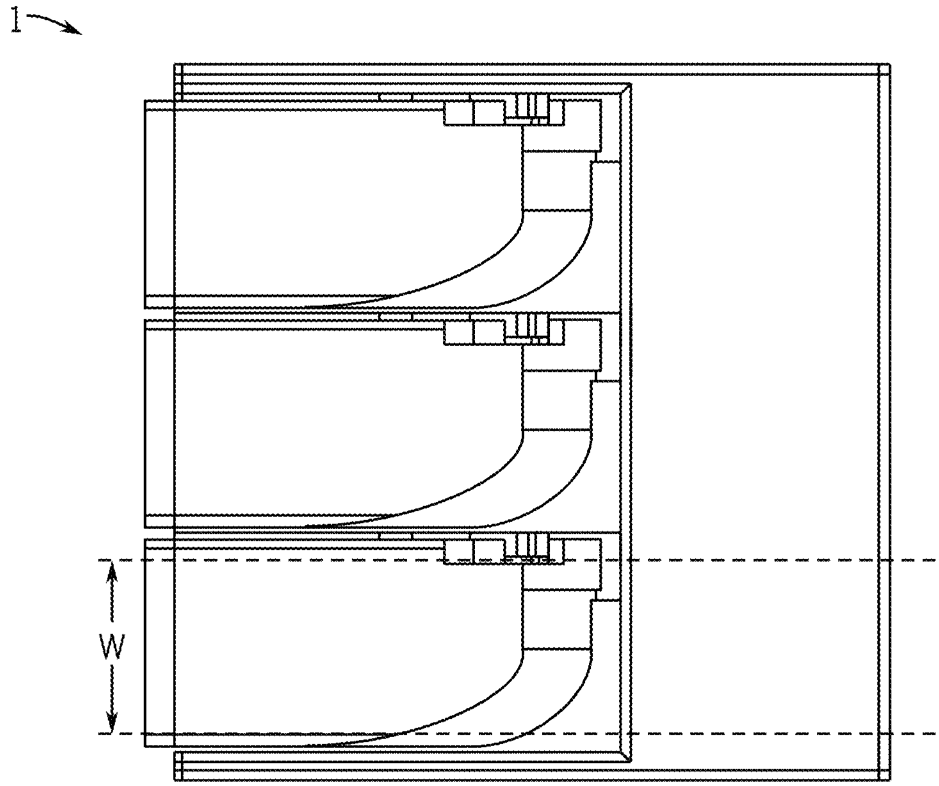

In the example illustrated in FIGS. 4A-4E, the actuating element comprises a single lever arm with a single operating portion 7*a*. The actuating element 3 is therefore, in the embodiment of FIGS. 4A-4E, an asymmetric actuating element that has an "L" shaped cross-section along the length of the element 3 as particularly shown in FIGS. 4B-4D where FIG. 4B shows a left side elevational view of the actuating element 3, FIG. 4C shows a right side elevational view of the actual element 3, and FIG. 4D illustrates a font elevational view of the actuating element 3. As further shown in FIGS. 4D and 4E, in this example, the portion 3*a* of the actuating element 3 opposite of the pivot portion 10 of the actuating element 3 has a surface which spans the entire width W of the wire port.

Turning to FIGS. 1A-1E, the illustrated conductor terminal 1 includes an actuating element 3 having a pair of opposed operating portions 7*a* and 7*b*. In the embodiment of FIGS. 1A-1E, the operating portions include extended insulative side walls 13 that help guide a conductor from the conductor insertion opening 4 to the clamping spring connection formed from the clamping spring 2 and a bus bar. Meanwhile, the wedge portions 9 that are used to interact with the clamping spring 2 are located exteriorly of the conductor insertion opening 4. The actuating element 3 is pivotally mounted to corresponding walls of the housing 5 at pivot portions 10. The pivot portion 10 and the wedge portion 9 are thus found on the same side of the actuating element 3. As further illustrated, the clamping spring 2 includes a spring member 12 that is intended to be acted upon by the wedge portion 9 when the actuating arm 3 is moved to the open state. Specifically, when the actuating arm 3 is pivoted, the wedge portion 9 will interact with the spring member 12 to drive the clamping spring 2 away from a clamping portion of the bus bar, thereby creating an opening 28 (shown in FIG. 10) between the clamping spring 2 and the bus bar into which a conductor may be inserted. As will be further appreciated from the figures, in this arrangement the rotation axis R of the actuating elements is positioned within the body of the electrical connector 1 but outside of the region created by a transverse extension of the conductor insertion opening 4. The housing walls may be further adapted as needed relative to the configuration of the actuating element 3 to ensure that the electrical conductor insertion passage is prevented from having any openings of a size that might expose the electrical conductor to unwanted contact or exposure.

Figure 2:
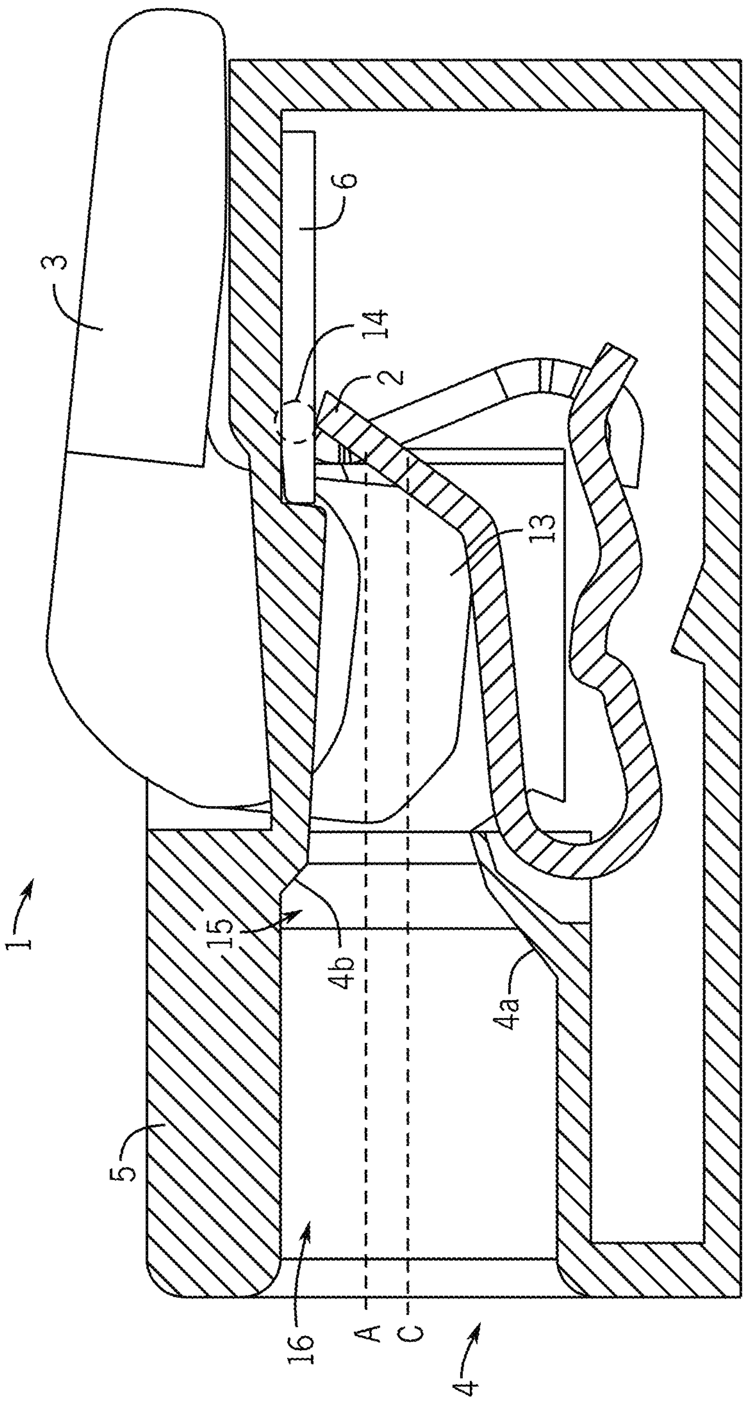
FIG. 2 illustrates a construction of an example conductor terminal.

Turning to FIG. 2, the conductor entry ports may be designed such that the center axis (A) of a lead-in portion 15 of the conductor insertion opening 4 is not shared with the center axis (C) of an entry portion 16 of the conductor insertion opening. Specifically, the center axis (C) of the entry portion 16 is generally caused to be planarly misaligned relative to the center axis (A) of the lead-in portion 15. In the illustrated example this planar misalignment is achieved via use of a ramping surface 4*a*. The misaligned center axes A, C cause the conductor within the electrical connector 1 to be non-linear when clamped within the clamp entry opening and the tortuous path created for the wire conductor improves wire retention within the conductor terminal 1.

The ramping surface 4*a* may be asymmetric from its opposed surface 4*b* across the axis A. For example, as illustrated in the FIG. 2, the opposed surface 4*b* may be at a different angle with respect to the axis A than the ramping surface 4*a*. Additionally, as illustrated in FIG. 2, the opposed surface 4*b* may be of a different length than the ramping surface 4*a*. In some embodiments, the ramping surface 4*a* may be parallel to the rotation axis R (e.g., may be a "top" or "bottom" surface of the conductor insertion opening 4).

Turning to FIGS. 3A and 3B, a conductor terminal 1 is illustrated in which the pivot portion 10 of the actuating member 3 is positioned on an opposite side of the conductor entry port 4 as compared to the conductor terminal 1 illustrated in FIGS. 1 and 2. As before, the spring clamp 2 is provided with a spring member 12 that is intended to be acted upon by the actuating arm 3 when the actuating arm 3 is moved to the opened state. Specifically, when the actuating arm 3 is pivoted, the actuating arm 3 will interact with the spring member 12 to pull the resilient clamping element of the spring clamp 2 away from the clamping portion of the bus bar 6 thereby creating the spring clamp insertion opening.

In the embodiment of FIGS. 3A and 3B, the operating lever 3 is configured to interact with the clamping spring 2 in order to apply force to the clamping spring 2 at a force application point 27 to actuate the clamping spring connection between the open state and the closed state. The force application point 27 is, in the open state (shown in FIG. 3B), on a first side (e.g., below) of a plane K that is parallel to the insertion direction I and that includes the rotation axis R, wherein the force application point is on a second side (e.g., above) of the plane K in the closed state (shown in FIG. 3A). In some embodiments, the operating lever 3 is disposed on the first side of the plane. Accordingly, in the arrangement of FIGS. 3A and 3B, the operating lever 3 may be considered to "pull" the clamping spring 2 open.

Turning to FIGS. 4A-4E a conductor terminal 1 having an actuating element with a lever arm section 7*a* is disclosed. As shown, the asymmetric actuating element has an "L" shaped cross-section along the length of the element. When assembled, the portion 3*a* of the actuating element 3 opposite of the bearing surface 8 has a surface which covers the entire width of the wire port 4. As will be understood, the use of an actuating element 3 having only a single lever arm section, and only a single pivot portion 10, allows for a narrower connector, is simpler to assemble, and provides an actuating element 3 that is more comfortable for a user to use.

FIGS. 5-16 illustrate a conductor terminal 1, and components or alternate components thereof, having many features in common with the conductor terminals 1 illustrated in FIGS. 1A-4D and will be referenced to illustrate and describe certain features of the conductor terminal 1 in greater detail.

Figure 5:
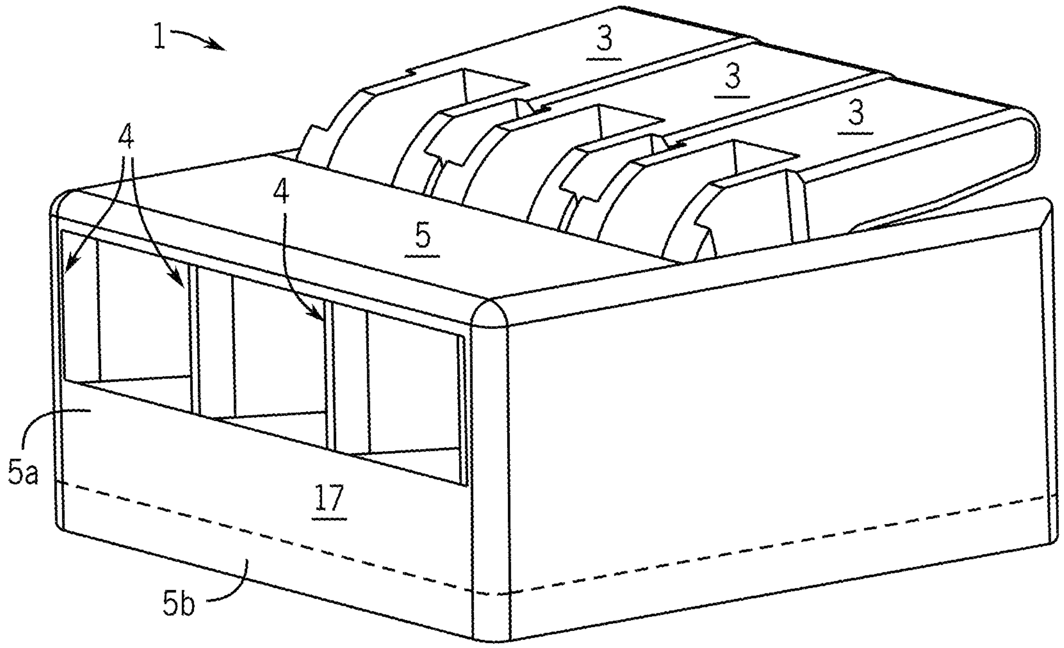
FIG. 5 is an isometric view of an example conductor terminal.
Figure 6:
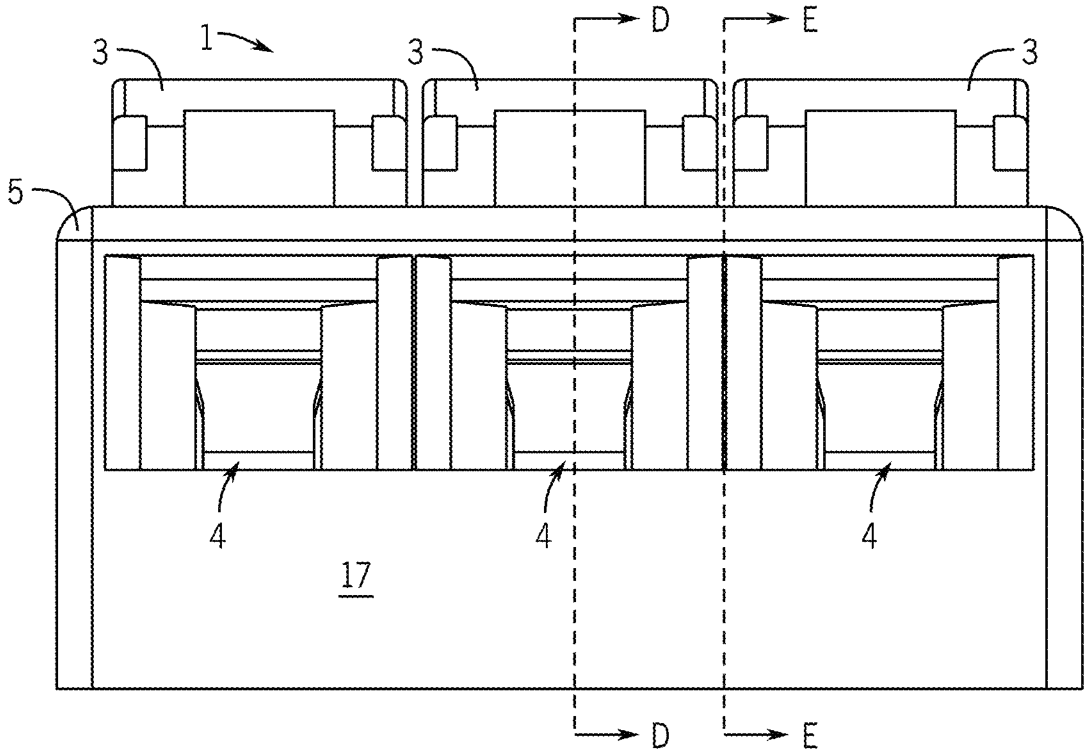
FIG. 6 is a front view of the example conductor terminal of FIG. 5.
Figure 7:
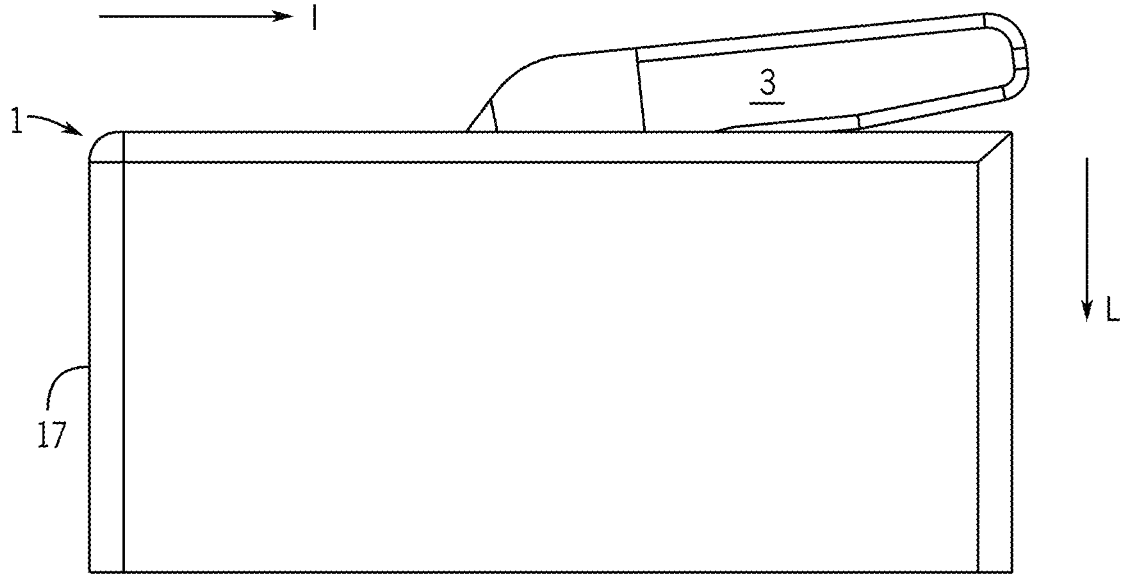
FIG. 7 is a side view of the example conductor terminal of FIG. 5.

Referring to FIGS. 5-7, the conductor terminal 1 may include a generally cuboid housing 5 defining three conductor insertion openings 4, each of which leads to a respective clamping spring connection. The conductor insertion openings 4 may be identical to one another, in some embodiments. The housing 5 may include a generally planar front face 17 from which the conductor insertion openings 4 extend. A conductor may be inserted into the conductor terminal 1 along a conductor insertion direction I (designated in FIG. 7). In some embodiments, as will be described with respect to FIG. 17, the conductor terminal may be assembled according to a process in which each operating lever 3 may be inserted into the housing 5 along a direction L (designated in FIG. 7) that is perpendicular to direction I. Three actuating elements 3, or operating levers 3, may be supported by the housing 5. The housing 5 may include multiple portions such as, for example, a lower portion 5*a* and an upper portion 5*b* (designated and separated by a dashed line in FIG. 5), in some embodiments.

Figure 8:
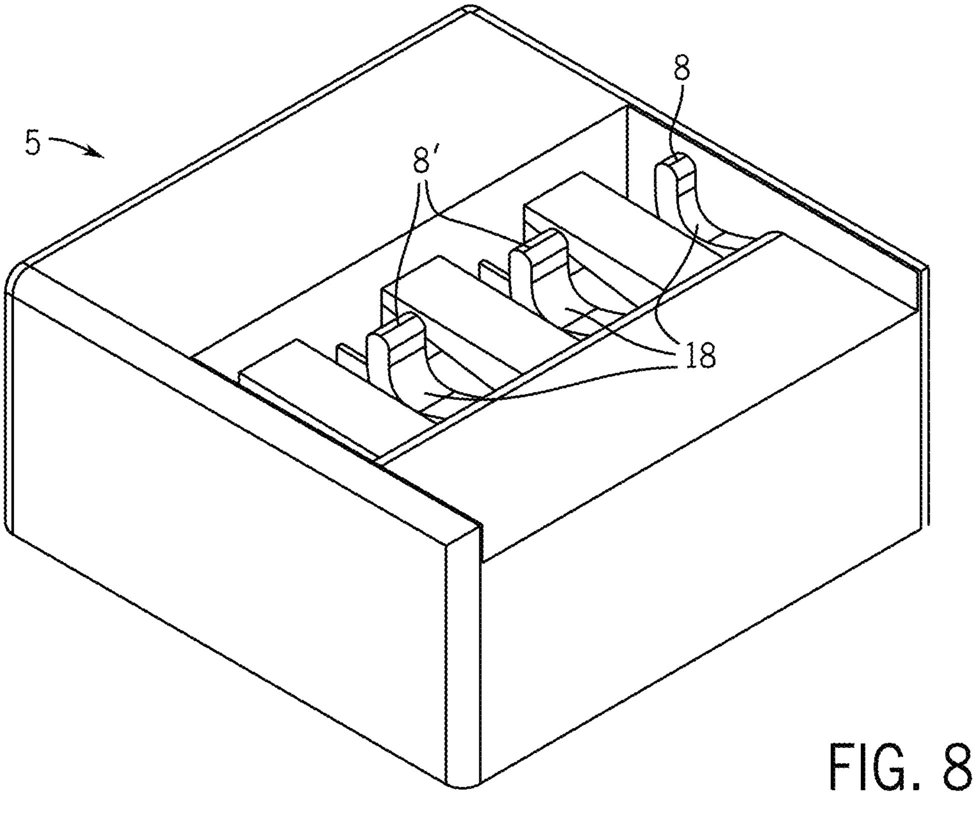
FIG. 8 is an isometric view of a housing of the example conductor terminal of FIG. 5.

FIG. 8 illustrates the housing 5 in isolation. The housing 5 may include a plurality of bearing arms 8. In some embodiments, a set of two bearing arms 8 may be provided for each operating lever 3. In some embodiments, two adjacent bearing arms 8 for two adjacent operating levers may be formed form a single body of material, or from a single contiguous arm 8'. In some embodiments, each bearing arm 8 may be or may include an arcuate portion 18 configured to retain a pivot pin or similar structure of an operating lever 3, such that the operating lever is supported by and may rotate with respect to the bearing arm 8. In some embodiments, the bearing arms 8 may be a part of and may be formed from a continuous material as the housing 5. In other embodiments, the bearing arms 8 may be formed from a different body of material or may be otherwise separate from, and coupled to, the housing 5.

Figure 9A:
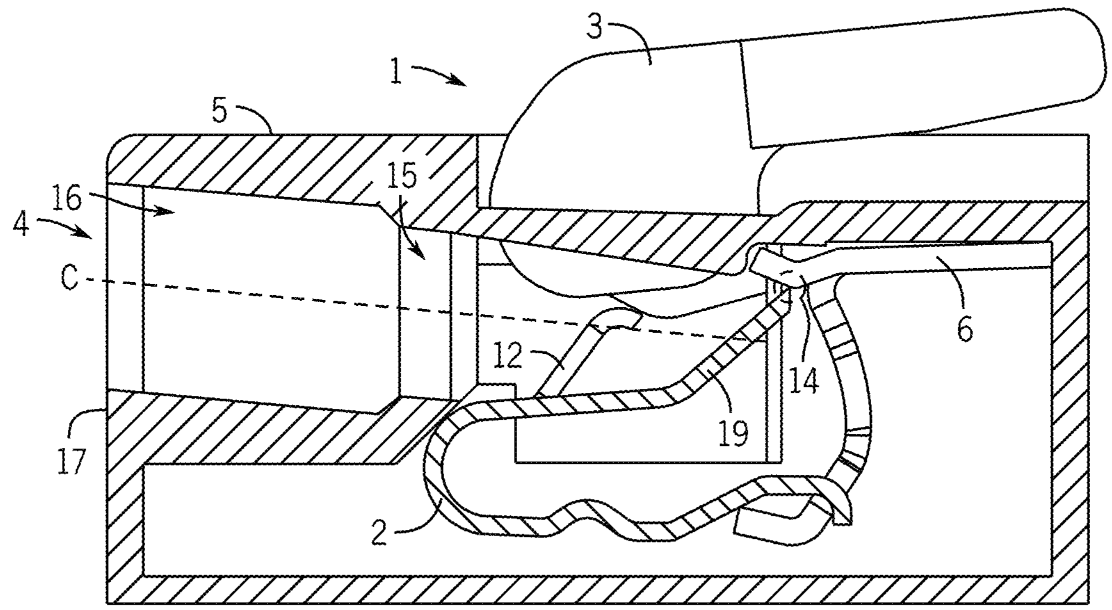
FIG. 9A is a side cross-sectional view of the example conductor terminal of FIG. 5. taken along line D-D in FIG. 6.
Figure 9B:
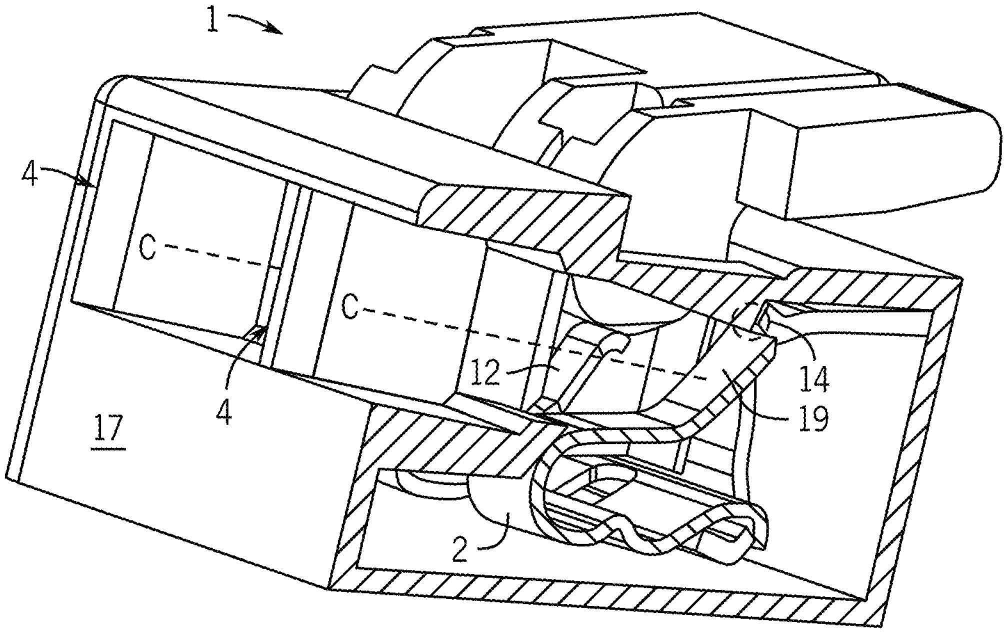
FIG. 9B is an isometric view of the cross-section of FIG. 9A.

Referring to FIGS. 9A and 9B, which are cross-sectional views taken along line D-D in FIG. 6, the conductor terminal 1 includes one or more clamping spring connections, each defined by a main portion 19 of the clamping spring 2 and a corresponding portion of the bus bar 6 at a clamping spring connection location 14. The main portion 19 of the clamping spring 2 may therefore be configured for clamping an electrical conductor to the bus bar 6. The conductor insertion opening 4 may include an entry portion 16, adjacent to the front face 17 of the housing 5, and a lead-in portion 15 adjacent to the clamping spring connection location 14. The lead-in portion 15 of the conductor insertion opening may be narrower than the entry portion 16. The lead-in portion 15 may include one or more surfaces that are at a non-perpendicular angle with respect to the front face 17 of the housing 5, as shown in FIGS. 2 and 9. The entry portion 16 may also be at a non-perpendicular angle to the front face 17, as shown in FIG. 9A.

Each conductor insertion opening may define a center axis C, which may be offset from the clamping spring connection location 14. As a result, when a conductor is inserted and the conductor is clamped between the clamping spring 2 and the bus bar 6, the conductor is bent into a tortuous shape, which aids with retention of the conductor in the clamp 1.

Figure 10:
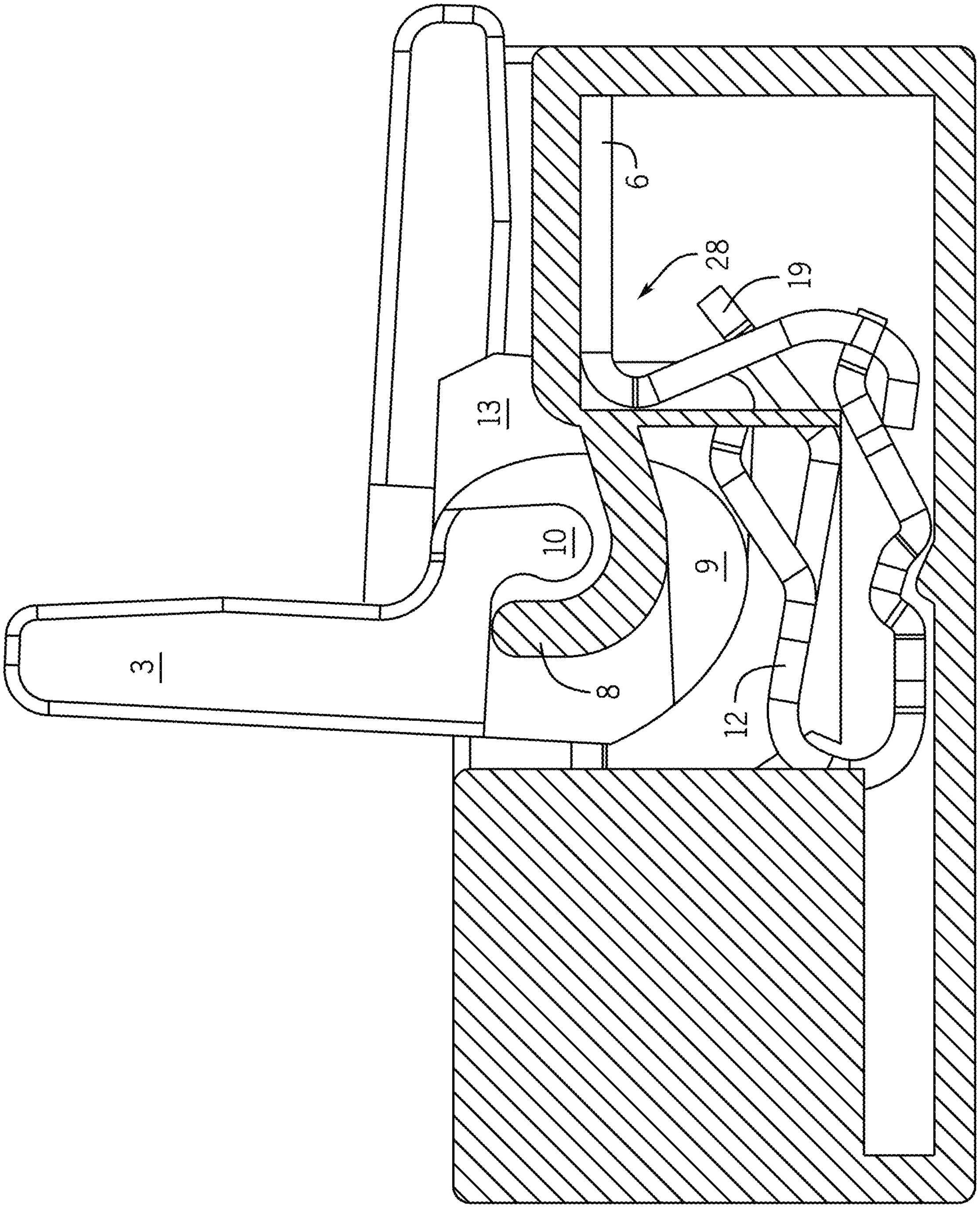
FIG. 10 is a side cross-sectional view of an example conductor terminal with a clamping connection in an open state.

As illustrated in FIG. 10, the operating arm 3 may rotate to an open state. Under such rotation, the wedge portion 9 may apply force to the spring member 12 so as to deflect the spring member 12 and main portion 19 and create an opening 28 into which a conductor may be inserted. Although FIG. 10 includes gaps between the bearing arm 8 and the pivot portion 10, and between the wedge portion 9 and the spring member 12, such components may be flush with one another in an open state, in some embodiments.

Figure 11:
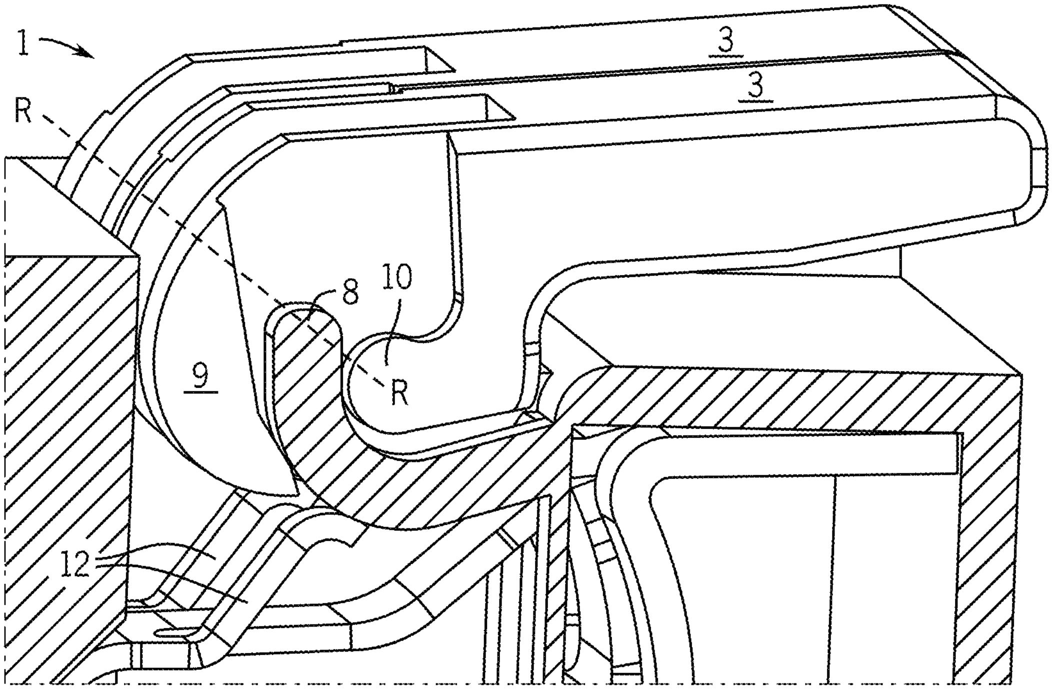
FIG. 11 is a side cross-sectional view of a portion of the example conductor terminal of FIG. 5, taken along line E-E in FIG. 6.
Figure 12:
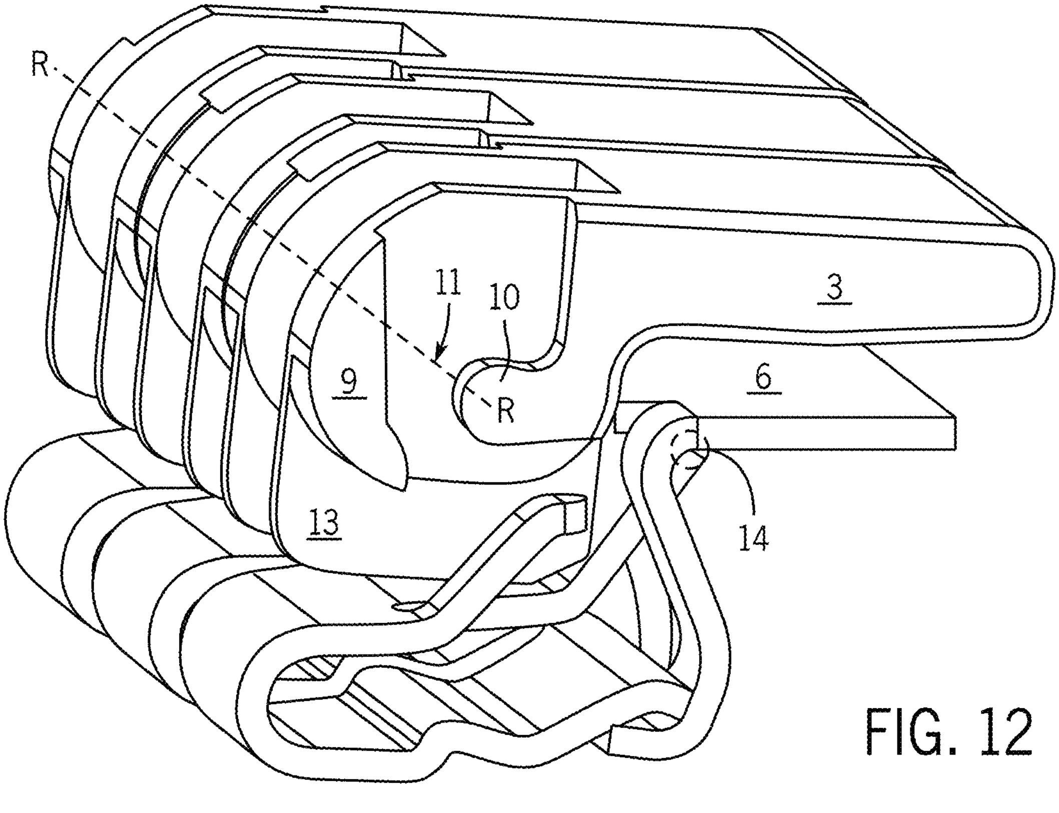
FIG. 12 is an isometric view of an example conductor terminal with the housing removed.

Referring to FIG. 11, which is a cross-sectional view of a portion of the terminal 1 taken along line E-E in FIG. 6, and FIG. 12, which is an isometric view of the conductor terminal 1 with the housing removed and alternative actuating elements 3, each operating lever 3 may include a pivot portion 10 and a wedge portion 9. The pivot portion 10, which may include a pin or similar structure, may be supported by the bearing arm 8. The wedge portion 9 may be configured to apply a force to the spring member 12 so as to wedge between the spring member 12 and bearing arm 8 when the operating lever 3 is rotated to deflect the spring member 12. The spring member 12 may be rigidly coupled with the main portion 19 such that deflection of the spring member 12 may result in substantially equal deflection of the main portion 19.

Each operating lever 3 may include two pivot portions 10 and two wedge portions 9, in some embodiments, with each pivot portion 10 supported by a respective bearing arm 8 and each wedge portion 9 arranged to interact with a respective spring member 12. Accordingly, each clamping spring connection may be associated with two spring members 12 and two wedge portions 9 for opening and closing the connection, in some embodiments. Each operating lever 3 may be configured to rotate about a rotation axis R. The rotation axis R may be perpendicular to an insertion direction I of a conductor through the conductor insertion opening 4.

Figure 14:
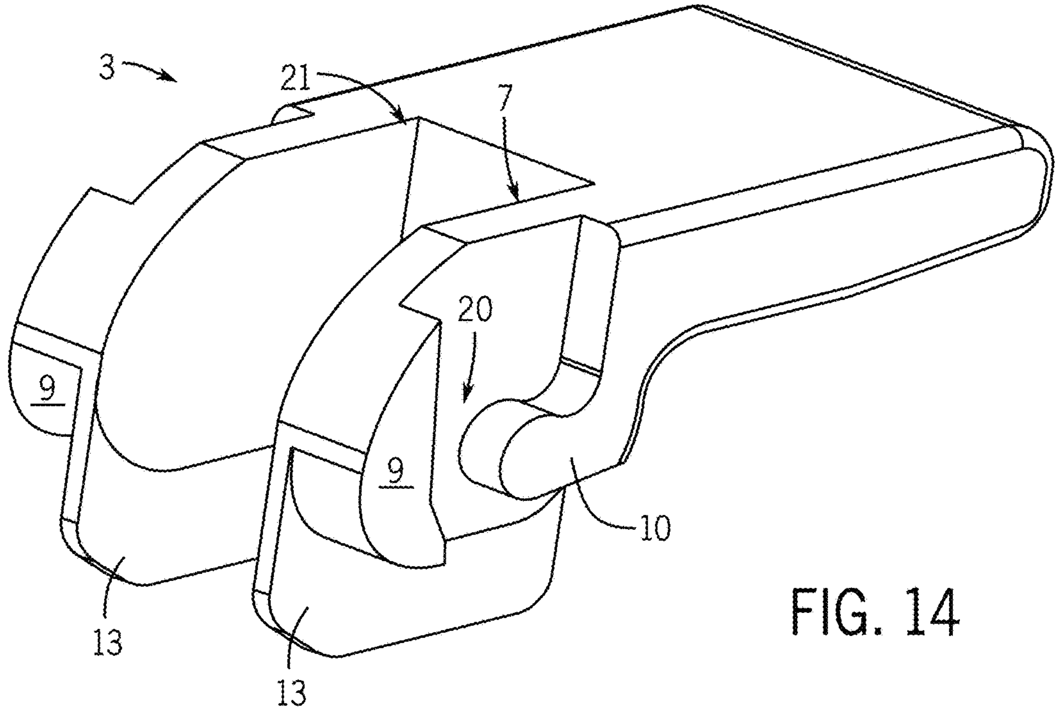
FIG. 14 is an isometric view of an example lever arm which may find use with the example conductor terminal of FIG. 5.

As shown in FIGS. 12 and 14, in some embodiments, the operating lever 3 may define one or more insulative walls 13 for guiding a conductor from the lead-in portion 15 of the conductor insertion opening 4 to the clamping spring connection location 14. The insulative walls 13 may be disposed on both sides (along a line parallel to the rotation axis R) of the clamping spring connection location 14 when the lever is in an open state. In an open state, the walls 13 may project along the conductor insertion direction from the wedge portion 9. In a closed state, the walls 13 may project along a direction that is perpendicular to the conductor insertion direction from the wedge portion 9, as shown in FIG. 12.

Referring to FIGS. 2, 12, and 14, an insulative wall 13 may be disposed between a bearing arm 8 and the clamping location 14. Further, an insulative wall 13 may be disposed between the pivot portion 10 and the clamping location 14. Further, an insulative wall 13 may be disposed between the wedge portion 9 and the clamping location 14. Accordingly, an insulative wall may prevent contact between a conductor and the bearing arm 8, pivot portion 10, and/or wedge portion 10 during insertion of the conductor. Preventing such contact may protect both the conductor and the bearing arm 8, pivot portion 10, and/or wedge portion 10. Preventing such contact may be particularly beneficial when the conductor is a stranded wire, which may be more susceptible than a solid wire to wire portions being diverted or bent.

Figure 13:
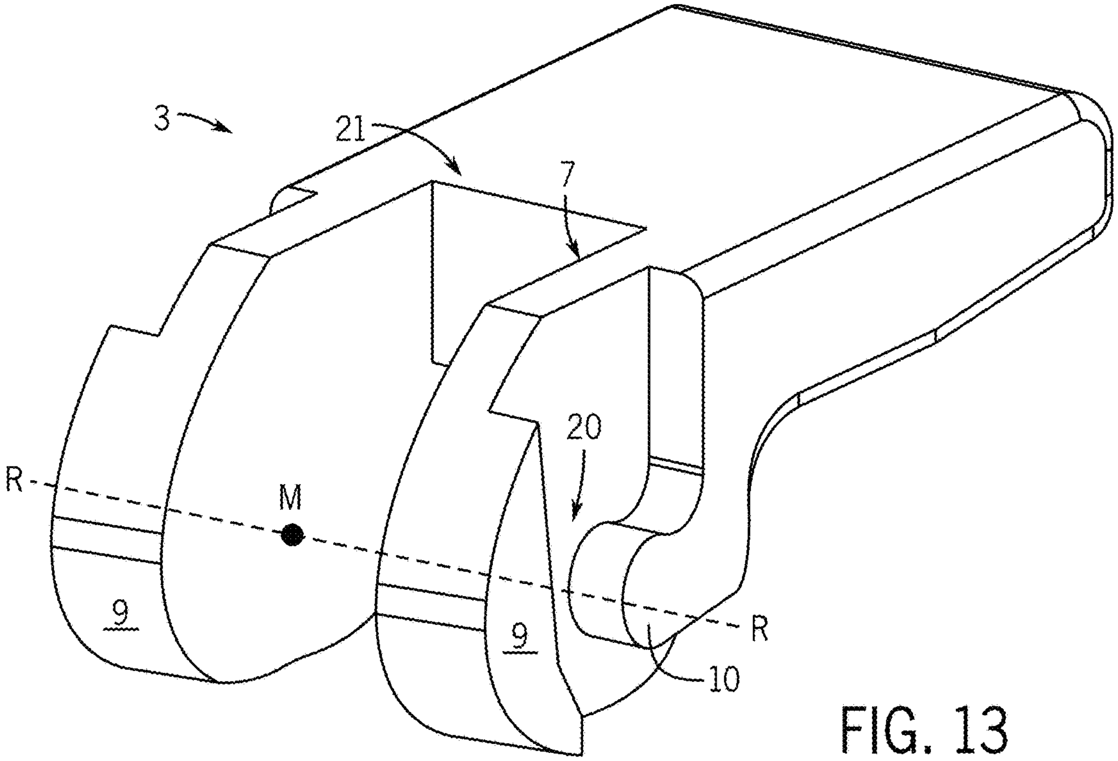
FIG. 13 is an isometric view of a lever arm of the example conductor terminal of FIG. 5.

Referring to FIGS. 13 and 14, the wedge portion 9 of the operating lever may be separated from the pivot portion of the operating lever by a gap 11 through which a bearing arm 8 may extend as the operating lever 3 is rotated under support of the bearing arm 8. In some embodiments, a wedge portion 9, gap 11, and pivot portion 10 may collectively define an operating portion 7 of the operating lever 3. Accordingly, in some embodiments, each operating lever 3 may include two operating portions 7. Each operating portion 7 may be separated from the other operating portion of the operating lever by a recess 21, which recess 21 may define a passageway from the lead-in portion of the conductor insertion opening to the clamping spring connection location. In some embodiments, such as the embodiment of FIG. 13, the operating lever 3 may be symmetric (e.g., have mirror symmetry) across a midpoint M of the rotation axis R.

Figure 15:
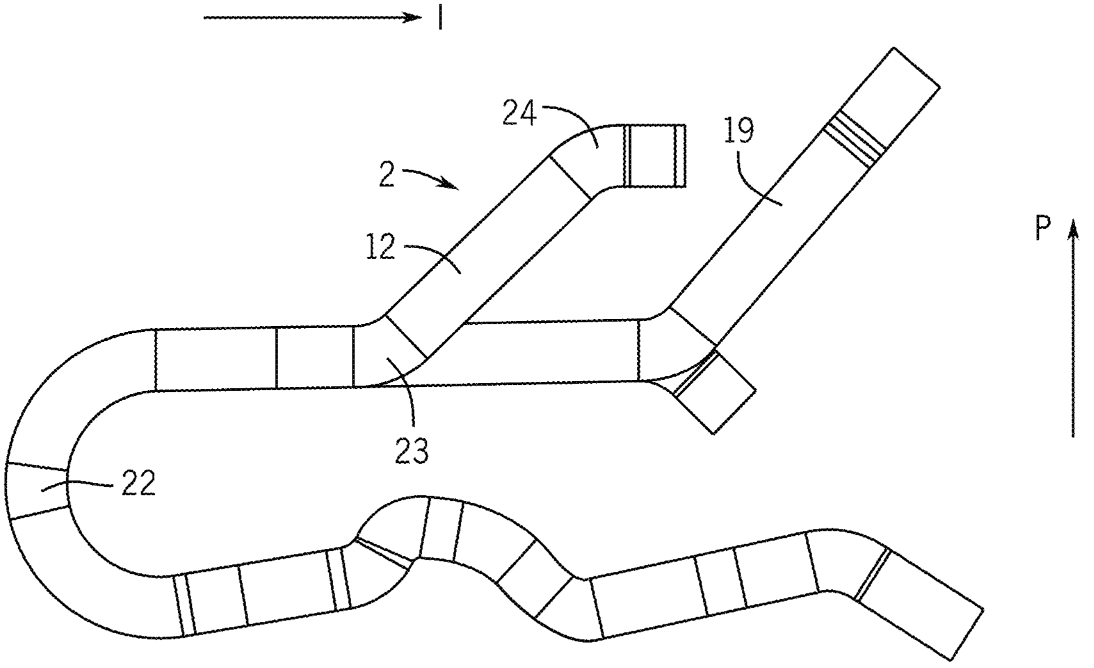
FIG. 15 is a side view of a clamping spring of the example conductor terminal of FIG. 5.
Figure 16:
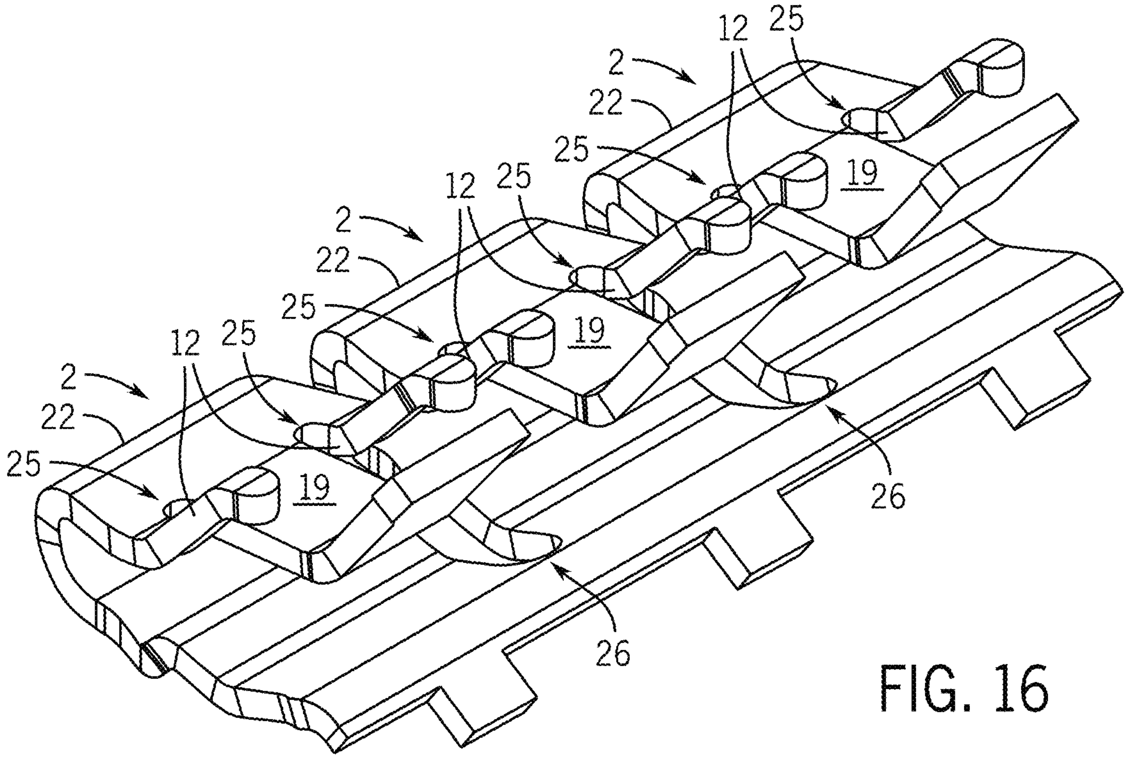
FIG. 16 is an isometric view of the clamping spring of the example conductor terminal of FIG. 5.

Referring to FIGS. 15 and 16, multiple clamping springs 2 may be formed from a monolithic body of material, in some embodiments. Each clamping spring 2 may include a main portion 19, two spring members 12, and a base portion 22 from which the main portion and spring members extend. In some embodiments, a main portion 19 and its associated spring member(s) 12 may be formed from a monolithic body of material. Each main portion 19 may extend further in the conductor insertion direction I (indicated as direction I in FIG. 15) than its corresponding spring members 12. Furthermore, each main portion 19 may extend further in a direction towards the operating levers 3 that is perpendicular to the conductor insertion direction (indicated as direction P in FIG. 16) than its corresponding spring members 12. The spring members 12 may be disposed on opposed sides of the main portion 19 (e.g., opposed along a line parallel to the rotation axis R).

Each spring member 12 may be generally S-shaped and may include a first curved portion 23 that extends the spring member 12 away the base portion 22 of the clamping spring 2 at a different angle than the main portion 19 and a second curved portion 24 that provides a surface with which operating lever interacts. Each spring member 12 may be separated from the main portion 19 along the direction of the rotation axis R by a slot 25. Further, each clamping spring 2 may be separated from each adjacent clamping spring 2 along the direction of the rotation axis R by a slot 26, such that adjacent clamping springs 2 are not rigidly coupled together and are separately deflectable.

Figure 17:
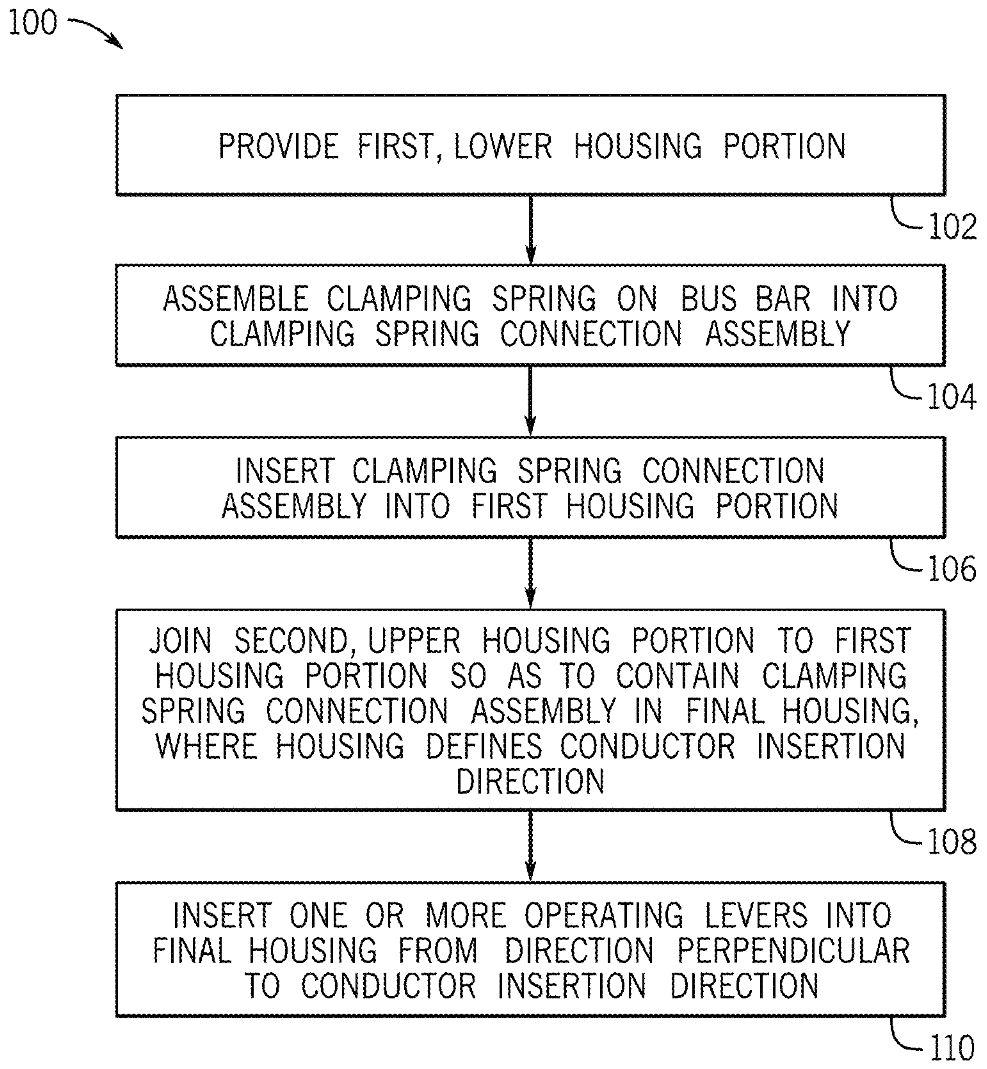
FIG. 17 is a flow chart illustrating an example method of assembling a conductor terminal.

FIG. 17 is a flow chart illustrating an example method 100 of assembling a conductor terminal 1. The method 100 may include, at block 102, providing a first, lower housing portion. The first housing portion may include what will become a bottom surface of the completed housing and, in some embodiments, one or more longitudinal channels extending along what will become a conductor insertion direction.

The method 100 may further include, at block 104, assembling a clamping spring and a bus bar into a clamping spring connection assembly. The clamping spring connection assembly may have one or more clamping spring connections (e.g., three clamping spring connections as shown in the examples herein).

The method 100 may further include, at block 106, inserting the clamping spring connection assembly into the first housing portion. At block 106, each clamping spring connection may be placed into a respective channel defined in the first housing portion.

The method 100 may further include, at block 108, joining a second, upper housing portion to the first housing portion so as to contain clamping spring connection assembly in a final housing. The housing may define a conductor insertion direction. The second housing portion may include one or more bearing arms, in some embodiments. The second housing portion may include what will become the sidewalls (including front face) of the completed housing and top of the completed housing, in some embodiments. The second housing portion may define one or more apertures in its upper surface through which operating levers may be inserted and through which the operating levers may project in the completed connector. In some embodiments, block 108 may include tack welding the first housing portion to the second housing portion or otherwise rigidly coupling the first and second housing portions to one another.

The method 100 may further include, at block 110, inserting one or more operating levers into the final housing from a direction perpendicular to the conductor insertion direction. The operating levers may be inserted such that they are supported by the bearing arms of the housing. Block 110, and specifically inserting the operating levers after the housing is completed and along a direction perpendicular to the conductor insertion direction, may provide advantages over known connector assembly methods, in which the operating levers are generally installed along the conductor insertion direction before the housing is complete. The method 100 provides for a simpler assembly process than known methods, because a housing piece does not need to be fitted over the operating levers and operating levers do not need to be inserted through other components along a conductor insertion direction. Furthermore, the method 100 permits replacement of a damaged operating lever.

While various concepts have been described in detail, it will be appreciated by those skilled in the art that various modifications and alternatives to those concepts could be developed in light of the overall teachings of the disclosure. It will be additionally appreciated that the particular concepts disclosed are meant to be illustrative only and not limiting as to the scope of the invention which is to be given the full breadth of the appended claims and any equivalents thereof.

What is claimed is:

1. A conductor connection clamp comprising:
a bus bar;
a clamping spring, the clamping spring comprising:
a main portion for clamping an electrical conductor to the bus bar, the main portion and bus bar defining a clamping spring connection; and
a spring member adjacent to the main portion and rigidly coupled to the main portion;
a housing defining a conductor insertion opening that leads to the clamping spring connection; and
an operating lever configured to apply force to the spring member in order to deflect the main portion to open the clamping spring connection, wherein:
the operating lever is configured to, in response to an actuation of a portion of the operating lever by a user, move between a first position corresponding to an open state of the clamping spring connection and a second position corresponding to a closed state of the clamping spring connection,
the operating lever is configured to move between the first position and the second position by rotating around a rotation axis, and
while the operating lever is at each of the first position and the second position, both the portion of the operating lever actuated by the user and the rotation axis are positioned on a same side of the conductor insertion opening;
wherein:
the spring member is a first spring member; and
the clamping spring further comprising a second spring member that is rigidly coupled to the main portion.

2. The conductor connection clamp of claim 1, wherein:
the conductor connection clamp comprises a bearing arm configured to support the operating lever;
the operating lever comprises a lever arm and a wedge portion; and
actuation of the lever arm causes the wedge portion to wedge between the bearing arm and the spring member so as to apply force to the spring member.

3. The conductor connection clamp of claim 2, wherein the operating lever is rotatably mounted and comprises a pivot portion, the pivot portion adjacent to the wedge portion, wherein the bearing arm supports the pivot element.

4. The conductor connection clamp of claim 1, wherein the main portion and spring member are formed from a monolithic body of material.

5. The conductor connection clamp of claim 1, wherein the first and second spring members are disposed on opposed sides of the main portion.

6. The conductor connection clamp of claim 1, wherein the clamping spring further comprises a base portion, wherein the spring member and main portion both extend along a conductor insertion direction from the base portion.

7. The conductor connection clamp of claim 6, wherein the main portion extends further in the conductor insertion direction than does the spring member.

8. The conductor connection clamp of claim 1, wherein a center axis of the conductor insertion opening is offset from a location of the clamping spring connection.

9. The conductor connection clamp of claim 1, wherein the operating lever comprises an insulative wall configured to guide a conductor from the conductor insertion opening to the clamping spring connection.

10. The conductor connection clamp of claim 1, wherein:

the operating lever is configured to interact with the clamping spring in order to apply force to the spring member at a force application point to actuate the clamping spring connection between the open state and the closed state, wherein the operating lever is rotatably coupled to the housing and is configured to rotate about the rotation axis;

the conductor insertion opening leads to the clamping spring connection along a conductor insertion direction; and the force application point is, in the open state, on a first side of a plane that is parallel to the insertion direction and that includes the rotation axis, wherein the force application point is on a second side of the plane in the closed state.

11. The conductor connection clamp of claim 1, wherein the operating lever is rotatably coupled to the housing and is configured to rotate about a rotation axis, wherein the operating lever is asymmetric across a midpoint of the rotation axis.

12. A conductor connection clamp comprising:

a bus bar;

a clamping spring, the clamping spring and bus bar defining a clamping spring connection, the clamping spring connection having a closed state and an open state, the clamping spring connection configured to retain a conductor at a clamping location in the closed state; and a housing defining a conductor insertion opening that leads to the clamping spring connection, the insertion opening defining a center axis extending along a conductor insertion direction;

wherein the center axis of the insertion opening is offset from the clamping spring connection, wherein while the operating lever is in both of a first position corresponding to the open state and a second position corresponding to the closed state, both a portion of the operating lever actuated by a user and a rotation axis about which the operating lever rotates are located on a same side of the conductor insertion opening;

wherein:

the conductor connection clamp comprises a bearing arm configured to support the operating lever;

the operating lever comprises a lever arm and a wedge portion; and actuation of the lever arm causes the wedge portion to wedge between the bearing arm and the spring member so as to apply force to the spring member.

13. The conductor connection clamp of claim 12, wherein the conductor insertion opening includes an asymmetric lead-in portion.

14. The conductor connection clamp of claim 13, further comprising a rotatably-mounted operating lever configured to apply force to the clamping spring to actuate the clamping spring connection between the closed state and the open state, wherein the operating lever rotates about the rotation axis;

wherein the lead-in portion comprises at least one surface that is parallel to the rotation axis and an opposed surface that is asymmetric to the at least one parallel surface.

15. The conductor connection clamp of claim 12, wherein the housing comprises a front face plane, wherein the lead-in portion is at a non-perpendicular angle to the front face plane.

16. The conductor connection clamp of claim 15, wherein an entry portion of the conductor insertion opening is at a non-perpendicular angle to the front face plane, wherein the entry portion and lead-in portion are at the same angle with respect to the front face plane.

17. A conductor connection clamp comprising:

a bus bar;

a clamping spring for clamping an electrical conductor to the bus bar, the clamping spring and bus bar defining a clamping spring connection having an open state and a closed state;

a housing defining a conductor insertion opening that leads to the clamping spring connection; and an operating lever configured to interact with the clamping spring in order to actuate the clamping spring connection between the open state and the closed state, the operating lever comprising an insulative wall configured to guide a conductor from the conductor insertion opening to the clamping spring connection, wherein while the operating lever is in each position corresponding with both the open state and the closed state of the clamping spring connection, both a portion of the operating lever actuated by a user and a rotation axis about which the operating lever rotates is located on a same side of the conductor insertion opening.

18. The conductor connection clamp of claim 17, further comprising:

a bearing arm configured to support the operating lever;

wherein the insulative wall is disposed between the bearing arm and a conductor clamping location where the clamping spring connection is configured to retain a conductor in the closed state.

19. The conductor connection clamp of claim 17, wherein the insulative wall projects perpendicular to a conductor insertion direction in the closed state and parallel to the conductor insertion direction in the open state.

20. The conductor connection clamp of claim 19, wherein the insulative wall rotates about the rotation axis that is perpendicular to the conductor insertion direction between the open state and the closed state.

21. The conductor connection clamp of claim 17, wherein the operating lever comprises a pivot supported by the housing and configured to rotate about the rotation axis, wherein the insulative wall is disposed between the pivot and a conductor clamping location where the clamping spring connection is configured to retain a conductor in the closed state.

22. The conductor connection clamp of claim 17, wherein the operating lever comprises two insulative walls disposed on opposed sides of a conductor clamping location where the clamping spring connection is configured to retain a conductor in the closed state.

23. A conductor connection clamp comprising:

a bus bar;

a clamping spring for clamping an electrical conductor to the bus bar, the clamping spring and bus bar defining a clamping spring connection having an open state and a closed state;

a housing defining a conductor insertion opening that leads to the clamping spring connection along a conductor insertion direction; and an operating lever rotatably coupled to the housing and configured to rotate about a rotation axis, the lever configured to interact with the clamping spring in order to apply force to the clamping spring at a force application point to actuate the clamping spring connection between the open state and the closed state;

wherein the operating lever is asymmetric across a midpoint of the rotation axis, and wherein both of the force application point and the rotation axis are on a same side of the conductor insertion opening while the clamping spring connection is in the open state and the closed state;

wherein:

the conductor connection clamp comprises a bearing arm configured to support the operating lever;

the operating lever comprises a lever arm and a wedge portion; and actuation of the lever arm causes the wedge portion to wedge between the bearing arm and the clamping spring so as to apply force to the spring member.

24. The conductor connection clamp of claim 23, wherein the operating lever is rotatably coupled to the housing and is configured to rotate about a rotation axis, wherein rotation of the operating lever causes the wedge portion to wedge between the bearing arm and the spring member so as to apply force to the spring member.

25. The conductor connection clamp of claim 24, wherein the operating lever is rotatably coupled to the housing and is configured to rotate about a rotation axis, wherein the operating lever includes only one pivot by which the operating lever is coupled to housing, the pivot supported by the bearing arm.

26. A conductor connection clamp comprising:

a bus bar;

a clamping spring, the clamping spring comprising:

a main portion for clamping an electrical conductor to the bus bar, the main portion and bus bar defining a clamping spring connection; and a spring member adjacent to the main portion and rigidly coupled to the main portion;

a housing defining a conductor insertion opening that leads to the clamping spring connection; and an operating lever configured to apply force to the spring member in order to deflect the main portion to open the clamping spring connection, wherein:

the operating lever is configured to, in response to an actuation of a portion of the operating lever by a user, move between a first position corresponding to an open state of the clamping spring connection and a second position corresponding to a closed state of the clamping spring connection, the operating lever is configured to move between the first position and the second position by rotating around a rotation axis, and while the operating lever is at each of the first position and the second position, both the portion of the operating lever actuated by the user and the rotation axis are positioned on a same side of the conductor insertion opening;

wherein:

the operating lever is configured to interact with the clamping spring in order to apply force to the spring member at a force application point to actuate the clamping spring connection between the open state and the closed state, wherein the operating lever is rotatably coupled to the housing and is configured to rotate about the rotation axis;

the conductor insertion opening leads to the clamping spring connection along a conductor insertion direction; and the force application point is, in the open state, on a first side of a plane that is parallel to the insertion direction and that includes the rotation axis, wherein the force application point is on a second side of the plane in the closed state.

27. Conductor connection clamp of claim 26, wherein the operating lever comprises an insulative wall configured to guide a conductor from the conductor insertion opening to the clamping spring connection.

* * * * *